US008890996B2

(12) United States Patent
Shimamoto

(10) Patent No.: US 8,890,996 B2
(45) Date of Patent: Nov. 18, 2014

(54) IMAGING DEVICE, SEMICONDUCTOR INTEGRATED CIRCUIT AND IMAGING METHOD

(71) Applicant: Panasonic Corporation, Osaka (JP)

(72) Inventor: Takeshi Shimamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/123,421

(22) PCT Filed: Mar. 15, 2013

(86) PCT No.: PCT/JP2013/001784
§ 371 (c)(1),
(2), (4) Date: Dec. 2, 2013

(87) PCT Pub. No.: WO2013/171954
PCT Pub. Date: Nov. 21, 2013

(65) Prior Publication Data
US 2014/0184883 A1    Jul. 3, 2014

(30) Foreign Application Priority Data

May 17, 2012    (JP) ................................ 2012-113370

(51) Int. Cl.
| | | |
|---|---|---|
| *G03B 13/00* | (2006.01) | |
| *H04N 5/232* | (2006.01) | |
| *H04N 5/228* | (2006.01) | |
| *G02B 13/16* | (2006.01) | |
| *H04N 5/225* | (2006.01) | |
| *H04N 5/222* | (2006.01) | |
| *G03B 7/08* | (2014.01) | |
| *G03B 3/00* | (2006.01) | |

(52) U.S. Cl.
CPC ......... *H04N 5/23212* (2013.01); *H04N 5/2226* (2013.01); *G03B 7/08* (2013.01); *G03B 3/00* (2013.01)
USPC ........ 348/348; 348/222.1; 348/335; 348/345; 348/353

(58) Field of Classification Search
USPC .............. 348/222.1, 335, 294–327, 345–357; 396/72–88, 121–124; 250/208.1
See application file for complete search history.

(56) References Cited

U.S. PATENT DOCUMENTS

| | | | |
|---|---|---|---|
| 5,148,502 A | | 9/1992 | Tsujiuchi et al. |
| 6,320,979 B1 * | | 11/2001 | Melen ........................... 382/154 |

(Continued)

FOREIGN PATENT DOCUMENTS

| | | |
|---|---|---|
| DE | 2301800 A | 10/1974 |
| JP | 60-068312 A | 4/1985 |

(Continued)

OTHER PUBLICATIONS

Nagahara et al., "Flexible Depth of Field Photography", European Conference on Computer Vision (ECCV), Oct. 16, Morning Session 2: Computational Photography (2008).

(Continued)

*Primary Examiner* — Michael Osinski
(74) *Attorney, Agent, or Firm* — Renner, Otto, Boisselle & Sklar, LLP

(57) ABSTRACT

An image capture device according to the present disclosure includes: an image sensor; a lens optical system condensing light onto the image sensor and including a focus lens; a driving section driving one of the image sensor and the focus lens to change a distance between the image sensor and the focus lens; a displacement control section configured to control the displacement of the one being driven according to a predetermined displacement pattern by outputting an instruction to the driving section; and a synchronizing section configured to control the displacement control section by reference to timing of exposure of the image sensor. The displacement range of the image sensor or focus lens includes a first range, a second range separated from the first range, and a third range interposed between the first and second ranges. The predetermined displacement pattern includes first, second and third types of displacement patterns according to which one of the image sensor and the focus lens is displaced at least once in each of the entire first, second and third ranges. And one of the first and second types of displacement patterns and the third type of displacement pattern repeated alternately.

19 Claims, 19 Drawing Sheets

(56) References Cited

U.S. PATENT DOCUMENTS

| | | | |
|---|---|---|---|
| 7,110,185 B2 * | 9/2006 | Saori | 359/666 |
| 7,711,259 B2 | 5/2010 | Daley | |
| 8,390,729 B2 * | 3/2013 | Long et al. | 348/345 |
| 8,412,036 B2 * | 4/2013 | Kawamura | 396/133 |
| 8,531,537 B2 * | 9/2013 | Suzuki et al. | 348/220.1 |
| 8,576,326 B2 * | 11/2013 | Kawamura | 348/345 |
| 8,698,943 B2 * | 4/2014 | Isogai et al. | 348/349 |
| 8,754,979 B2 * | 6/2014 | Tomita | 348/353 |
| 2001/0035910 A1 * | 11/2001 | Yukawa et al. | 348/349 |
| 2004/0131348 A1 | 7/2004 | Ohba et al. | |
| 2006/0198624 A1 | 9/2006 | Ono et al. | |
| 2006/0262209 A1 * | 11/2006 | Kishi | 348/297 |
| 2007/0196093 A1 * | 8/2007 | Tanaka | 396/133 |
| 2008/0002960 A1 * | 1/2008 | Ito et al. | 396/125 |
| 2008/0013941 A1 * | 1/2008 | Daley | 396/121 |
| 2009/0028539 A1 * | 1/2009 | Nakahara | 396/104 |
| 2009/0059057 A1 * | 3/2009 | Long et al. | 348/343 |
| 2009/0109304 A1 * | 4/2009 | Guan | 348/240.99 |
| 2010/0073514 A1 * | 3/2010 | Hayashi | 348/229.1 |
| 2010/0073529 A1 * | 3/2010 | Uchida | 348/262 |
| 2010/0080482 A1 * | 4/2010 | Wong et al. | 382/255 |
| 2010/0194958 A1 * | 8/2010 | Honda et al. | 348/311 |
| 2010/0259637 A1 * | 10/2010 | Suzuki | 348/222.1 |
| 2011/0007173 A1 * | 1/2011 | Takenaka et al. | 348/222.1 |
| 2011/0115966 A1 * | 5/2011 | Ueda et al. | 348/345 |
| 2011/0242378 A1 * | 10/2011 | Mabuchi | 348/296 |
| 2011/0292254 A1 * | 12/2011 | Ito | 348/241 |
| 2011/0292275 A1 * | 12/2011 | Kawamura | 348/345 |
| 2011/0292364 A1 * | 12/2011 | Kawamura | 355/55 |
| 2012/0026386 A1 * | 2/2012 | Tomita | 348/345 |
| 2012/0126097 A1 * | 5/2012 | Kishi | 250/208.1 |
| 2012/0148109 A1 * | 6/2012 | Kawamura et al. | 382/106 |
| 2012/0154668 A1 * | 6/2012 | Kimura et al. | 348/348 |
| 2012/0182455 A1 * | 7/2012 | Gomi et al. | 348/311 |
| 2012/0293708 A1 * | 11/2012 | Ryu et al. | 348/363 |
| 2012/0300114 A1 | 11/2012 | Isogai et al. | |
| 2012/0327222 A1 * | 12/2012 | Ng et al. | 348/135 |
| 2013/0027587 A1 * | 1/2013 | Matsui et al. | 348/241 |
| 2013/0113984 A1 | 5/2013 | Shimamoto et al. | |
| 2013/0222624 A1 * | 8/2013 | Kane et al. | 348/208.4 |

FOREIGN PATENT DOCUMENTS

| | | |
|---|---|---|
| JP | 05-027084 | 4/1993 |
| JP | 05-313068 A | 11/1993 |
| JP | 3084130 | 6/2000 |
| JP | 3191928 B | 5/2001 |
| JP | 2012-005063 A | 1/2012 |
| WO | WO 02/082805 | 10/2002 |
| WO | WO 2012/066774 | 5/2012 |
| WO | WO 2012/117733 | 9/2012 |
| WO | WO 2012/140899 | 10/2012 |

OTHER PUBLICATIONS

Matsui et al., "Focus Sweep Imaging for Depth From Defocus", IPSJ SIG Technical Report, Nov. 18, 2010, pp. 1-8, vol. 2010-CVIM-174, No. 6, Information Processing Society of Japan, Tokyo, Japan.

International Search Report for corresponding International Application No. PCT/JP2013/001784, mailed Apr. 23, 2013.

Written Opinion for corresponding International Application No. PCT/JP2013/001784, dated Apr. 23, 2013, with partial English translation.

Co-pending U.S. Appl. No. 13/809,951, filed on Jan. 14, 2013.

Co-pending U.S. Appl. No. 17/075,506, filed Nov. 8, 2013 (copy provided).

* cited by examiner

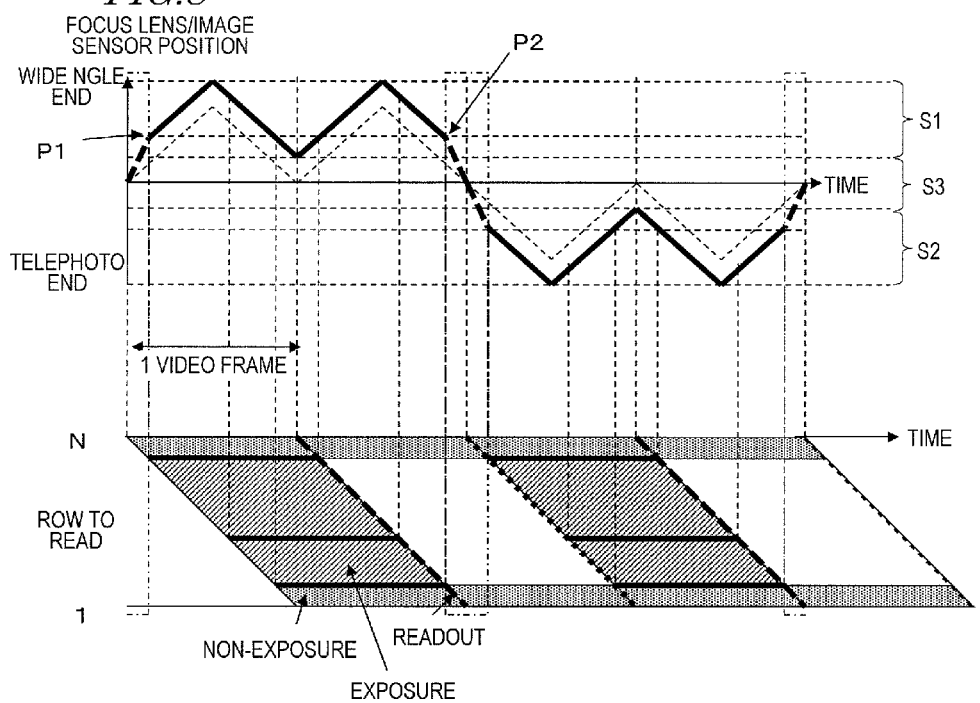
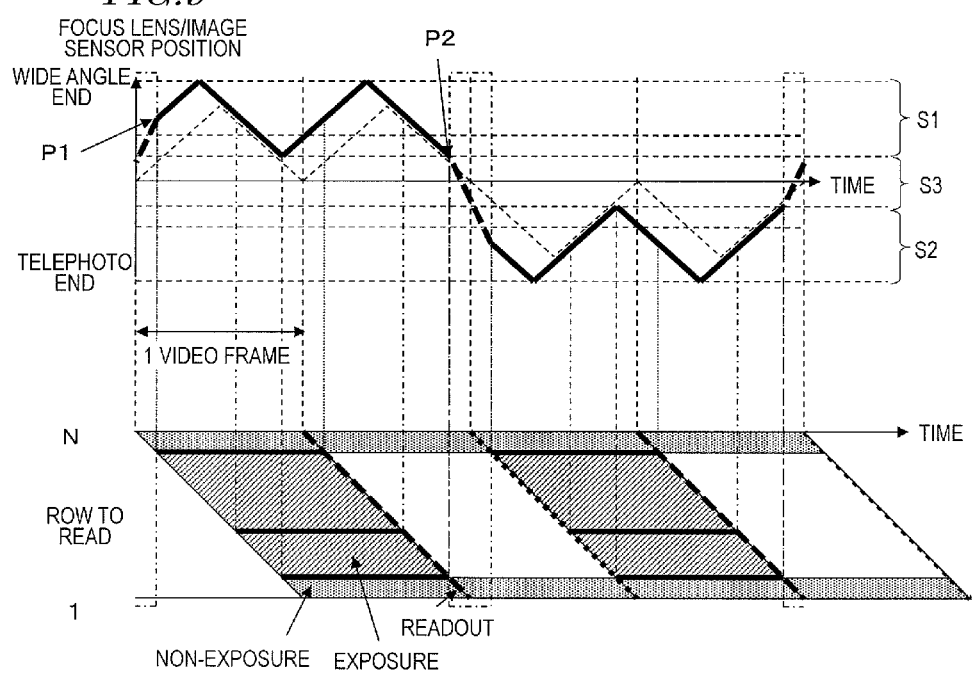

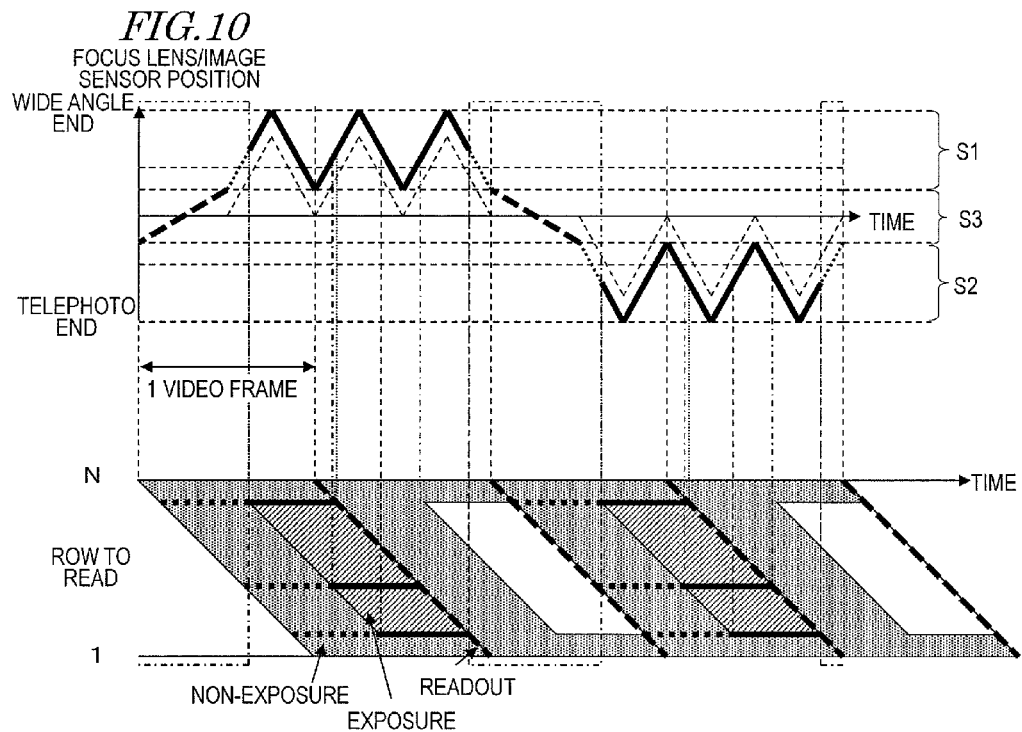
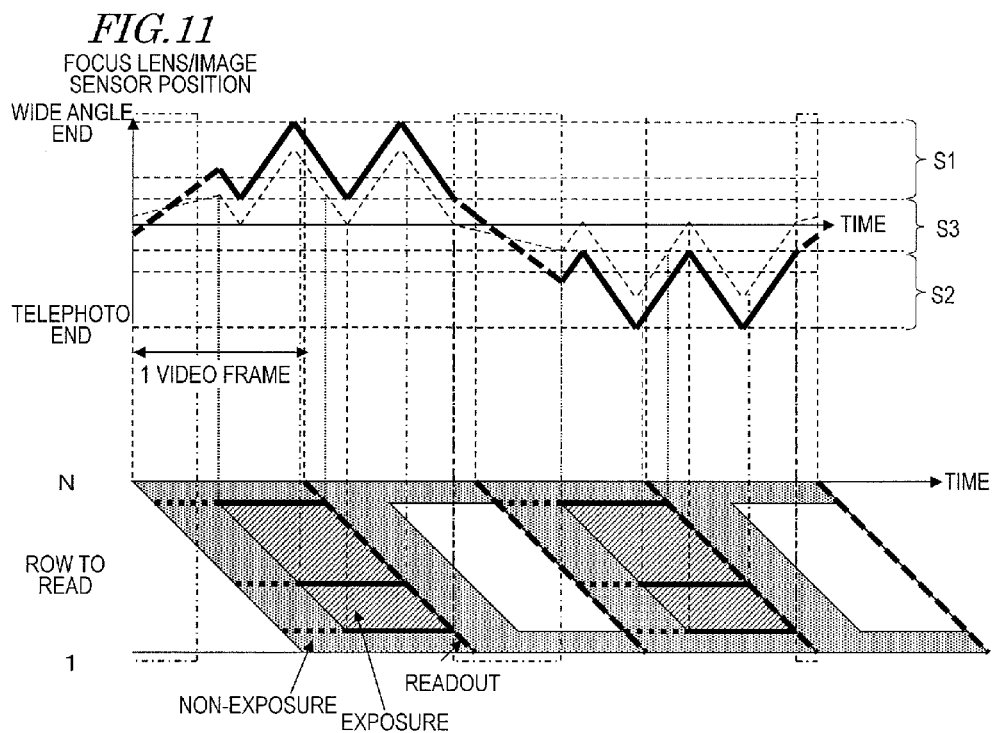

FIG.18
(a)
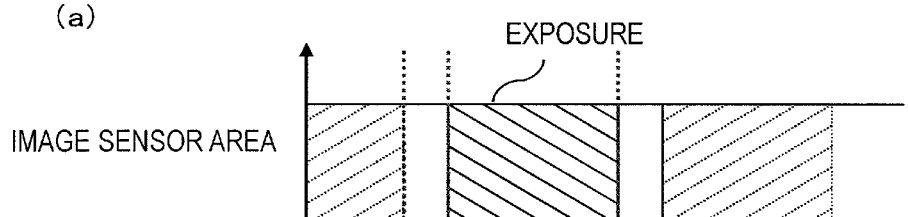
(b)
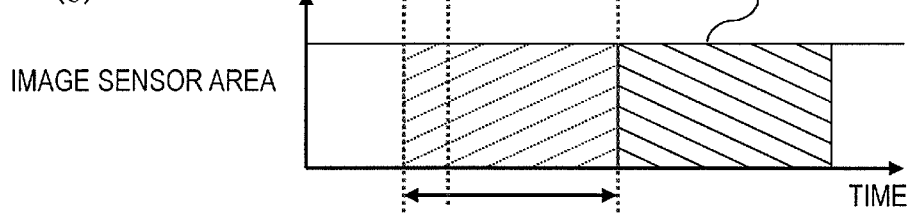
(c)
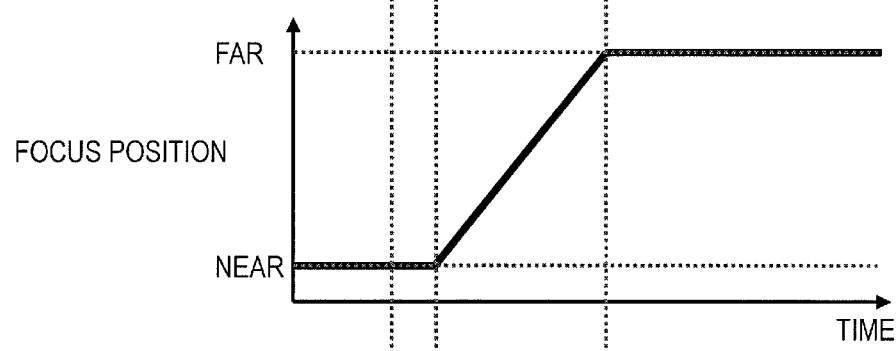
(d)
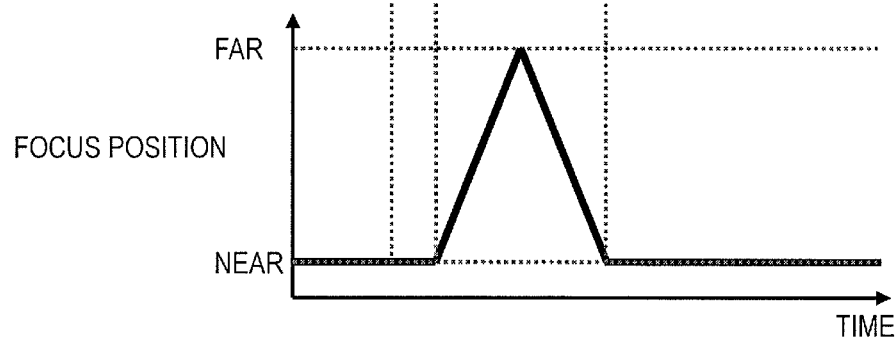

IMAGING DEVICE, SEMICONDUCTOR INTEGRATED CIRCUIT AND IMAGING METHOD

TECHNICAL FIELD

The present application relates to an image sensor which can shoot a moving picture by using the extended depth of field technology.

BACKGROUND ART

Various methods have been proposed to realize an extended depth of field (which will be abbreviated herein as "EDOF") for an image capture device. For example, an method for obtaining an EDOF image by performing a focus sweep operation with either a focus lens or an image sensor moved during an exposure time, convoluting images that are uniformly in focus in the depth direction (which is synonymous to making the degrees of blur uniform at respective depths) and carrying out image restoration processing using an image blur pattern that has been obtained in advance through measurement or simulation is proposed in Non-Patent Document No. 1. Such a method is called "Flexible DOF" (which will be abbreviated herein as "F-DOF").

The F-DOF is known as a method by which good image quality is achieved, and also contributes to achieving significant EDOF effects. Since the off-axis characteristic also depends on the property of the lens itself, the performance can be enhanced easily. However, even if the focus position is moved during the exposure, the same subject needs to be convoluted at the same location on the image, and therefore, to use an image space telecentric lens is an optical condition to be satisfied according to this method.

A microscope is one of various applications of the EDOF technology. When an image is captured through a microscope, the object of shooting is a still object, and therefore, the shooter can take a lot of time to shoot such an object. For that reason, a "Focal Stack" method has been used for a long time. According to the focal stack method, a number of images with mutually different in-focus positions are shot, and areas that seem to be in-focus are extracted from the respective images and synthesized together, thereby obtaining an EDOF image. However, as it takes a lot of time and trouble to get these works done, techniques that also use the F-DOF method in combination have been proposed (see Patent Documents Nos. 1 to 4). If the F-DOF method is applied to a microscope, either the sample as the subject or the lens barrel is moved during the exposure. If image restoration processing is supposed to be performed after the exposure, the subject or the lens barrel is moved so that the image always gets blurred to the same degree. It is known that it would be reasonable to appropriately control the way of moving it, because an image restoration method using a single image blur pattern can be used in that case (see Patent Document No. 5). For that purpose, if the image sensor is to be moved, the image sensor should be moved at a constant velocity. Also, if the focus lens is to be moved, the focus lens should be displaced so that the image capturing plane moves at a constant velocity (see Non-Patent Document No. 1). It is known that the pattern may be moved from the far-side focus end position to the near-side focus end position, or vice versa.

An example of such a method is shown in FIG. 18. Specifically, portions (a) and (b) of FIG. 18 show how the exposure state and reading status of the image sensor change with time (which is indicated by the abscissa). On the other hand, portion (c) of FIG. 18 shows how the focus lens is displaced. In portion (c) of FIG. 18, the abscissa indicates the time and the ordinate indicates the focus position. In portions (a) and (b) of FIG. 18, the shadowed ranges indicate the timings to perform an exposure and read data with respect to the image sensor. By performing an exposure on the image sensor synchronously with the operation of displacing the focus position from the near-side focus end position to the far-side focus end position, an image in which subjects at various locations in the same scene are convoluted together in the same area on the image while keeping them in in-focus state can be obtained. In this description, such a displacement of the focus position will be referred to herein as a "sweep pattern" and an image obtained in this manner will be referred to herein as a "sweep image". Another example is shown in portion (d) of FIG. 18. In this example, a sweep image is obtained by displacing the focus position from the nearer in-focus position to the far-side focus end position and then back to the nearer in-focus position while the exposure is performed on the image sensor. Even with such a sweep pattern, if the focus lens is displaced at a constant velocity through a linear displacement range, then the exposure time will be uniform at each focus position. As a result, the same sweep image as what has already been described with reference to FIG. 18(c) can also be obtained.

This technique is applicable to ordinary digital still cameras and digital camcorders. Recently, digital still cameras and digital camcorders need to be designed so as to allow the user to shoot more easily without making too many mistakes. The EDOF technology is expected to keep the users from shooting all-in-focus images (i.e., making focusing errors). When the EDOF technology is applied to digital still cameras and digital camcorders, the F-DOF method should be preferred, because high image quality will be achieved, significant EDOF effects will be achieved, the EDOF range can be changed arbitrarily, the EDOF can be achieved by adopting an ordinary autofocus mechanism (i.e., without providing any special optical system), and the EDOF shooting and normal shooting can be switched easily.

CITATION LIST

Patent Literature

Patent Document No. 1: German Patent No. 2301800
Patent Document No. 2: Japanese Patent Gazette for Opposition No. 5-27084
Patent Document No. 3: Japanese Patent Publication No. 3191928
Patent Document No. 4: U.S. Pat. No. 7,711,259
Patent Document No. 5: Japanese Patent Publication No. 3084130

Non-Patent Literature

Non-Patent Document No. 1: H. Nagahara, S. Kuthirummal, C. Zhou and S. Nayar, "Flexible Depth of Field Photography", European Conference on Computer Vision (ECCV), Oct. 16th, Morning Session 2: Computational Photography (2008)
Non-Patent Document No. 2: Shuhei Matsui, Hajime Nagahara and Rinichiro Taniguchi, "Focus Sweep Imaging for Depth from Defocus", Research Report of Information Processing Society of Japan, 2010-CVIM-174, No. 6 (2010)

SUMMARY OF INVENTION

Technical Problem

If the EDOF technology is applied to digital still cameras and digital camcorders, a moving picture should be able to be shot in the EDOF mode and information about the subject distance should be able to be obtained. The present application provides an image capture device which can shoot an EDOF moving picture and which can obtain accurate subject distance information, and also provides an integrated circuit for use in such an image capture device, and an image capturing method.

Solution to Problem

An image capture device according to an aspect of the present invention includes: an image sensor which includes a plurality of photoelectric conversion elements that are arranged two-dimensionally to form an image capturing plane and which gets the plurality of photoelectric conversion elements exposed to light and reads an electrical signal from the plurality of photoelectric conversion elements, thereby generating an image signal; a lens optical system which collects light onto the image sensor and which includes a focus lens; a driving section which drives one of the image sensor and the focus lens so as to change a distance between the image sensor and the focus lens; a displacement control section which is configured to control the displacement of the one being driven according to a predetermined displacement pattern by outputting an instruction to the driving section; and a synchronizing section which is configured to control the displacement control section by reference to timing of exposure of the image sensor. The displacement range of the one includes a first range, a second range which is separated from the first range, and a third range interposed between the first and second ranges, between a first in-focus position of the focus lens or the image sensor at which a focus is set at a first subject distance in a scene to be shot and a second in-focus position of the focus lens or the image sensor at which a focus is set at a second subject distance in the scene to be shot. The predetermined displacement pattern includes first, second and third types of displacement patterns according to which one of the image sensor and the focus lens is displaced at least once in each of the entire first, second and third ranges. And one of the first and second types of displacement patterns and the third type of displacement pattern are repeated alternately.

Advantageous Effects of Invention

An image capture device according to the present disclosure gets a focus lens displaced in two ranges, of which the displacement ranges are separate from each other, thereby getting a half sweep EDOF image. In addition, the image capture device according to the present disclosure can also estimate the subject distance accurately.

BRIEF DESCRIPTION OF DRAWINGS

FIG. 8 shows an exemplary focus lens displacement pattern and exemplary timing of exposure according to the third embodiment.

FIG. 9 shows an exemplary focus lens displacement pattern and exemplary timing of exposure according to the third embodiment.

FIG. 10 shows an exemplary focus lens displacement pattern and exemplary timing of exposure according to the third embodiment.

FIG. 11 shows an exemplary focus lens displacement pattern and exemplary timing of exposure according to the third embodiment.

FIGS. 18($a$) and 18($b$) show the timing of exposure for an image sensor, and 18($c$) and 18($d$) show focus lens displacement patterns for obtaining an EDOF image at the timing of exposure shown in 18($a$) and 18($b$).

DESCRIPTION OF EMBODIMENTS

The present inventors made an intensive research to find exactly what structure would be suitable for obtaining an EDOF moving picture in a digital still camera or digital camcorder with a focus lens driving mechanism such as an autofocus mechanism for use in an ordinary shooting session.

Figure 19:
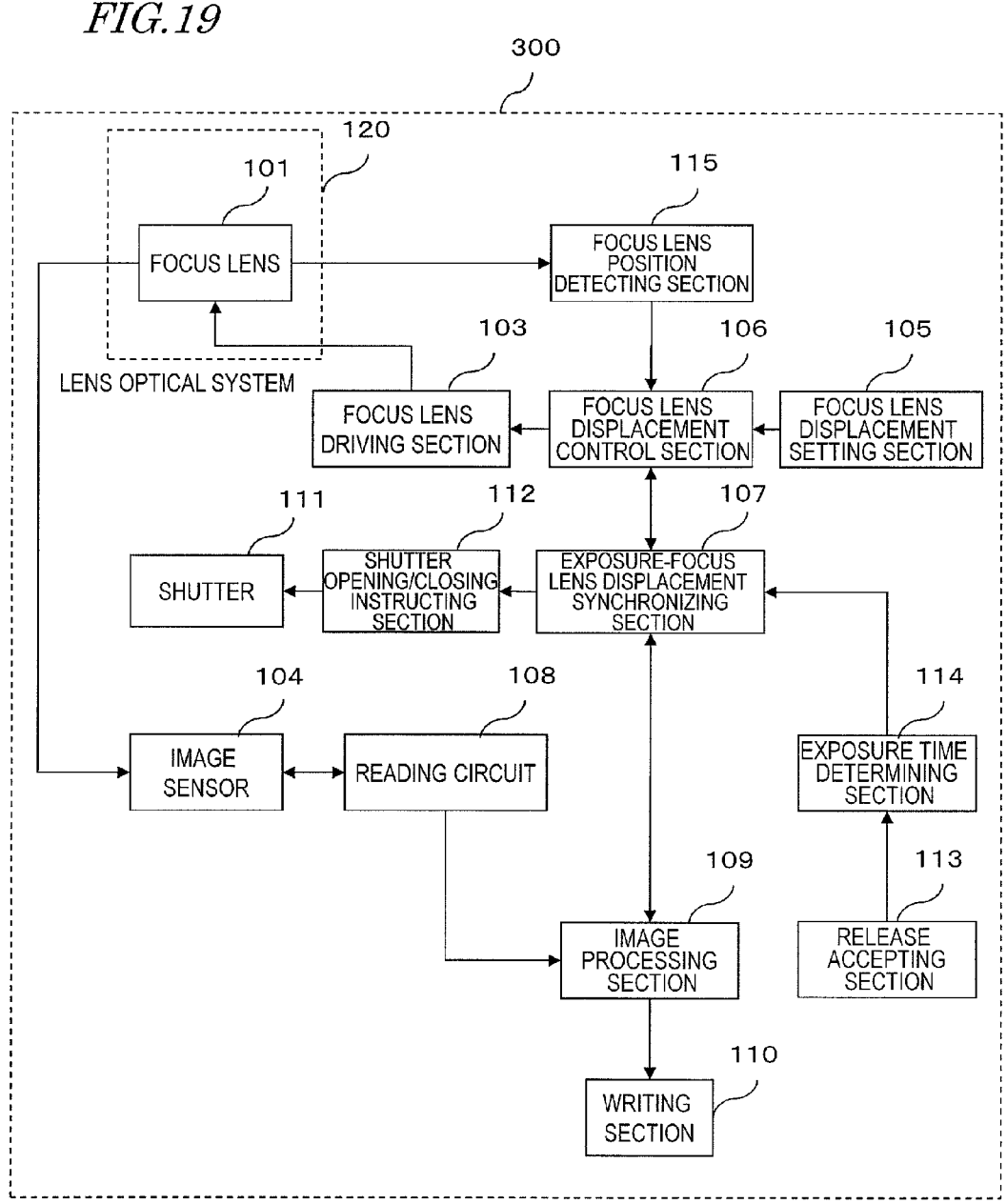
FIG. 19 is a block diagram illustrating a configuration for an image capture device which was inspected by the present inventors.

First of all, a configuration that needs to be used to get F-DOF shooting done will be described with reference to FIG. 19. The image capture device 300 shown in FIG. 19 has a structure for displacing a focus lens during an exposure period. The image capture device 300 includes a lens optical system 120 including a focus lens 101, a focus lens driving section 103 for driving the focus lens 101, and an image sensor 104. By changing the position of the focus lens 101, the distance to the image sensor 104, and eventually the focal length, can be changed. Supposing the focus lens 101 is fixed, to change the focal length is synonymous to changing the focus position.

When a release accepting section 113 receives a user's instruction to start exposure, a focus lens position detecting section 115 detects the position of the focus lens 101 at that point in time (i.e., its initial position). After the position has been detected, the focus lens 101 is moved to a predetermined end position (e.g., the wide angle end or the telephoto end).

Figure 20:
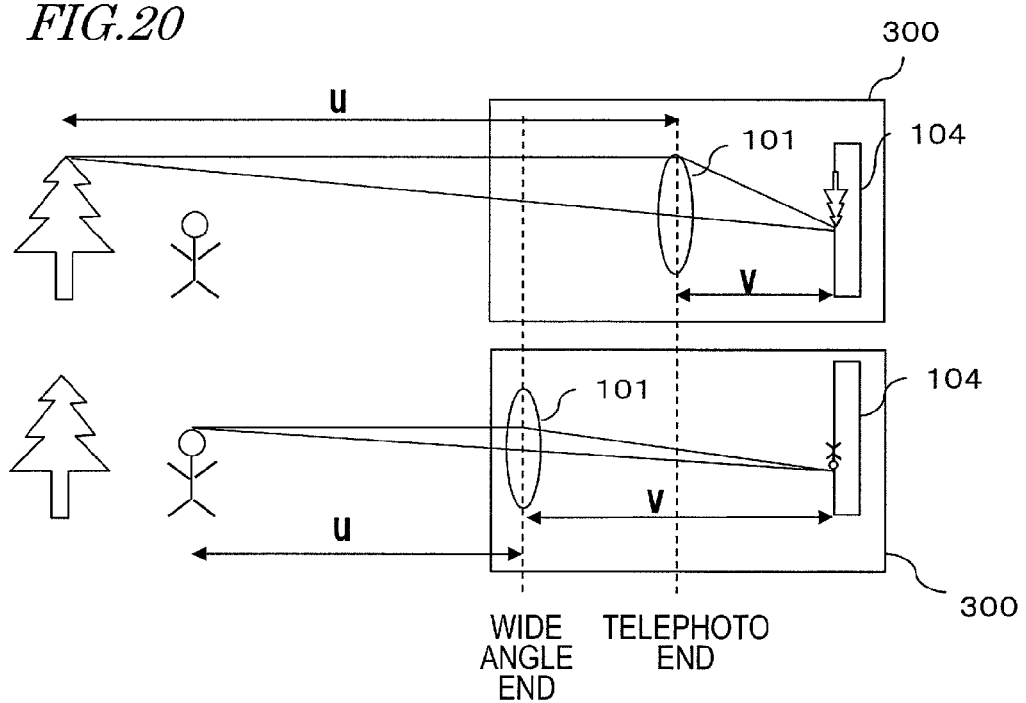
FIG. 20 illustrates relative positions of subjects, a focus lens and an image sensor.

FIG. 20 is a schematic representation illustrating the relative positions of a subject included in a scene to be shot with respect to the focus lens 101 and image sensor 104 in the image capture device 300.

In this description, the "wide angle end" refers herein to the position of the focus lens 101 which has been moved so that an image of a subject which is included in the scene to be shot and which is located nearer to the image capture device 300 than any other subject in the same scene is produced on the image capturing plane of the image sensor 104. In that case, the distance u from the subject on which the focus is set on the image capturing plane to the focus lens 101 of the image capture device 300 becomes the shortest, while the distance v between the focus lens 101 and the image sensor 104 becomes the longest.

On the other hand, the "telephoto end" refers herein to the position of the focus lens 101 which has been moved so that an image of a subject which is included in the scene to be shot and which is located farther away from the image capture device 300 than any other subject in the same scene is produced on the image capturing plane of the image sensor 104. In that case, the distance u from the subject on which the focus is set on the image capturing plane to the focus lens 101 of the image capture device 300 becomes the longest, while the distance v between the focus lens 101 and the image sensor 104 becomes the shortest. It should be noted that the ratio of the distance between the wide angle end and the telephoto end of the focus lens 101 to the distance between the subject and the image capture device 300 is illustrated in FIG. 20 as being longer than the actual one to facilitate the illustration.

While initializing work is being performed on the focus lens 101, a shutter speed, an F value and other shooting parameters are determined by an exposure time determining section 114. As soon as these operations are finished, an exposure-focus lens displacement synchronizing section 107 which synchronizes the exposure and the focus lens displacement with each other outputs an instruction to start an exposure process to a focus lens displacement control section 106 and a shutter opening/closing instructing section 112. At the same time, according to the end position of the focus lens 101 that has been detected by the focus lens position detecting section 115, the exposure-focus lens displacement synchronizing section 107 outputs an instruction to displace the focus lens 101 either from the telephoto end to the wide angle end, or vice versa, during the exposure period to the focus lens displacement control section 106.

Figure 21:
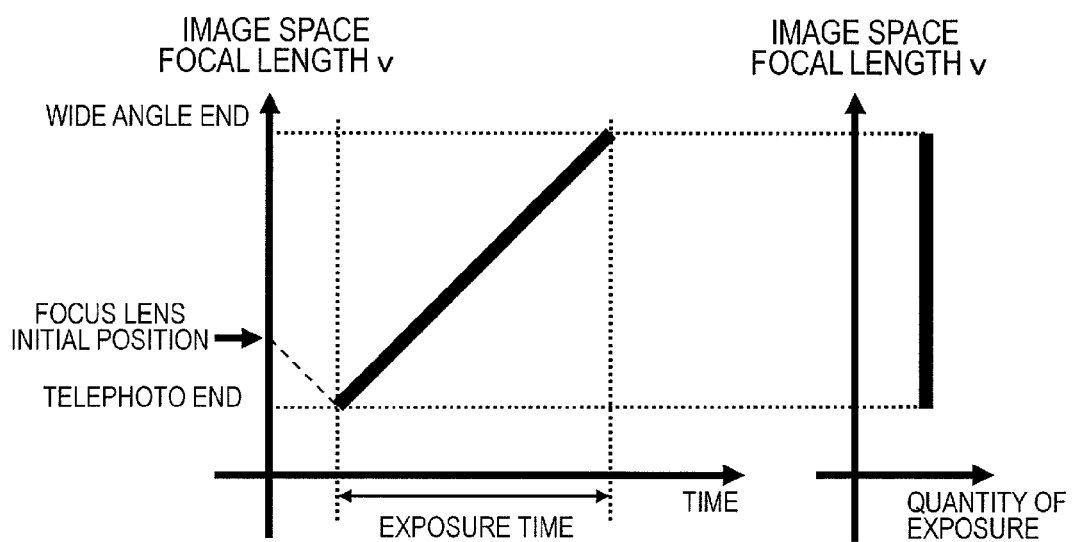
FIG. 21 shows how the exposure time changes with the position of a focus lens in the image capture device shown in FIG. 18.

FIG. 21 shows how the time and quantity of exposure change with the image surface-side focal length. The focus lens 101 is driven by the focus lens driving section 103 in accordance with the instruction given by the focus lens displacement control section 106 so that the image surface-side focal length changes according to the position of the focus lens 101 and that the position of the focus lens changes at a constant velocity with respect to the plane of the image sensor. If the distance between the subject and the focus lens 101 is u, the distance between the focus lens 101 and the image sensor 104 is v as described above, and if the focal length is f, then the following relation is satisfied according to the lens formula:

$$1/f = 1/u + 1/v \tag{1}$$

Figure 22:
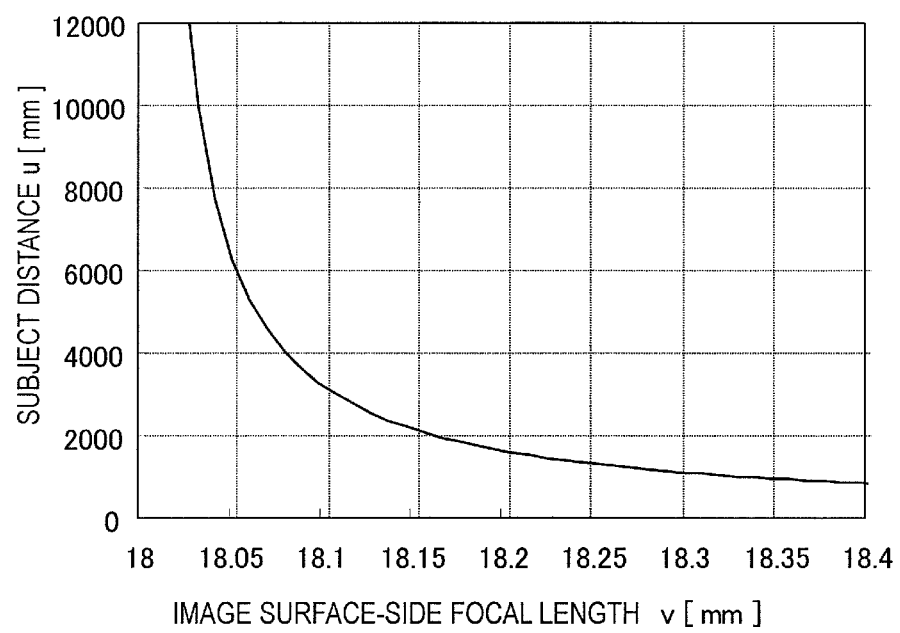
FIG. 22 is a graph showing an exemplary relation between the subject distance u and the image surface-side focal length v.

If there are multiple lenses, the calculations are made at the lens principal point. For example, the relation between u and v when f is 18 [mm] is shown in FIG. 22. As the focus lens 101 is displaced, the distance v between the lens principal point and the image sensor changes. To drive the focus lens 101 so that the focus lens is displaced at a constant velocity with respect to the image sensor plane means that this distance v changes at a constant rate. However, even if v changes at a constant rate, the distance u between the focal plane on the subject side and the lens principal point does not change at a constant rate as shown in FIG. 22. Also, since the abscissa indicates the image surface-side focal length v in FIG. 22, the image surface-side focal length v changes in the opposite direction from the subject distance u. That is to say, the longer the subject distance (i.e., the farther away the subject is located), the shorter the image surface-side focal length v.

On receiving the instruction to start an exposure process from the exposure-focus lens displacement synchronizing section 107, the shutter opening/closing instructing section 112 performs a control so that the shutter 111 opens. Also, after a predetermined exposure period passes, the exposure-focus lens displacement synchronizing section 107 outputs an instruction to end the exposure process to the shutter opening/closing instructing section 112. On receiving the instruction to end the exposure process, the shutter opening/closing instructing section 112 performs a control so that the shutter 111 closes.

When an optical image of the subject is produced on the image sensor 104 by performing this procedure, the optical image produced is converted into an electrical signal by the image sensor 104 and an image signal is output to an image processing section 109 via a reading circuit 108. At the same time, the exposure-focus lens displacement synchronizing section 107 notifies the image processing section 109 that the exposure process has ended and that the displacement of the focus lens has been shot by the F-DOF method. In response, the image processing section 109 receives the image signal, performs necessary signal processing on the signal, and then outputs it to a writing section 110.

Figure 23:
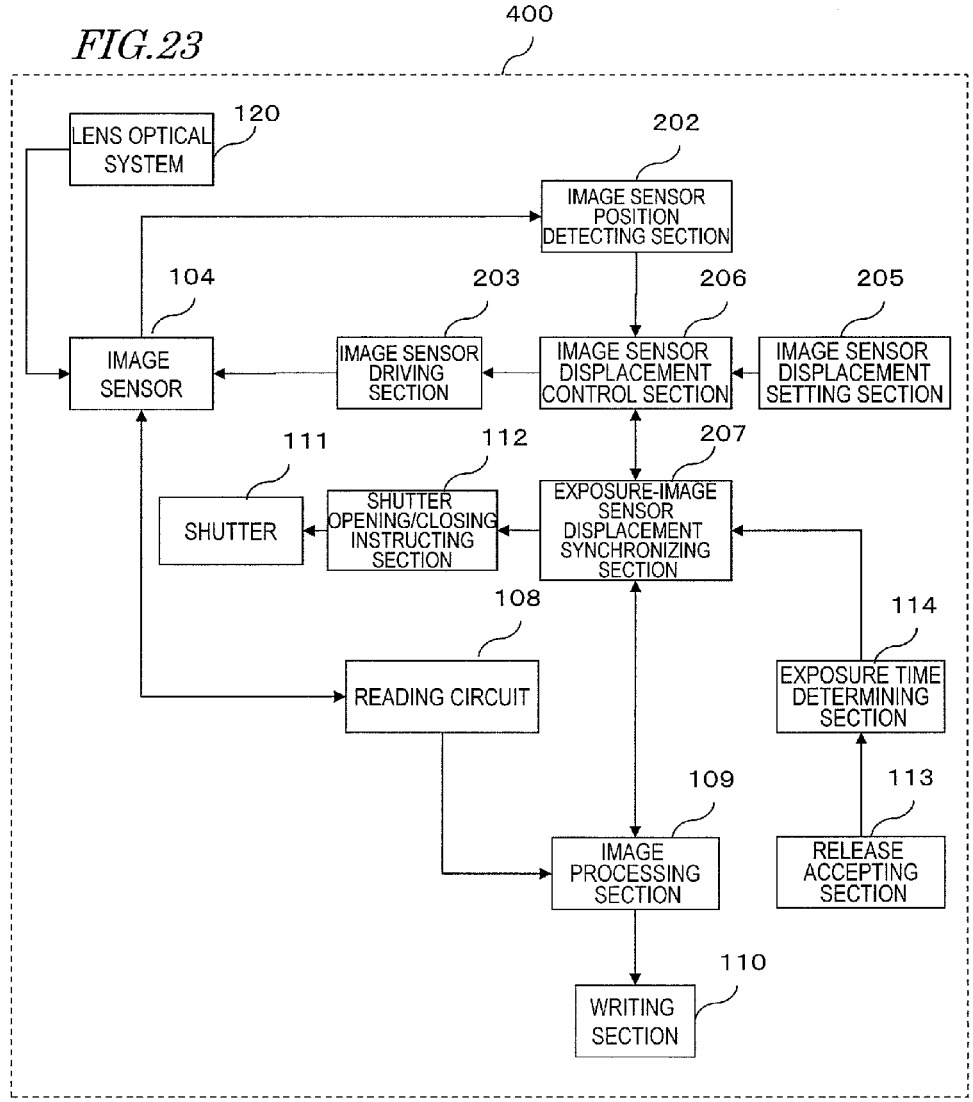
FIG. 23 is a block diagram illustrating a configuration for another image capture device which was inspected by the present inventors.

The image capture device 400 shown in FIG. 23 includes an image sensor 104, an image sensor position detecting section 202, an exposure-image sensor displacement synchronizing section 207, an image sensor displacement control section 206, and an image sensor driving section 203, and displaces the image sensor during an exposure period. Unlike the image capture device 300, the image sensor position detecting section 202 detects the position of the image sensor 104. The exposure-image sensor displacement synchronizing section 207 synchronizes the timing of exposure and the timing of displacing the image sensor 104 with each other. The image sensor displacement control section 206 controls the displacement of the image sensor 104. And the image sensor driving section 203 drives the image sensor 104 in accordance with a signal supplied from the image sensor displacement control section 206.

When the release accepting section 113 receives a user's instruction to start exposure, the image sensor position detecting section 202 detects the position of the image sensor 104 at that point in time (i.e., its initial position). After the position has been detected, the image sensor 104 is moved to a predetermined end position (e.g., the wide angle end or the telephoto end). In this description, the "wide angle end" refers herein to the position of the image sensor 104 which has been moved within a predetermined in-focus range so that an image of a subject which is included in the scene to be shot and which is located nearer to the image capture device 400 than any other subject in the same scene is produced on the image capturing plane of the image sensor 104. In that case, the distance u from the subject to the focus lens 101 becomes the shortest, while the distance v between the focus lens 101 and the image sensor 104 becomes the longest. On the other hand, the "telephoto end" refers herein to the position of the image sensor 104 which has been moved so that an image of a subject which is included in the scene to be shot and which is located farther away from the image capture device 400 than any other subject in the same scene is produced on the image capturing plane of the image sensor 104. In that case, the distance u from the subject to the focus lens 101 becomes the longest, while the distance v between the focus lens 101 and the image sensor 104 becomes the shortest.

While initializing work is being performed on the image sensor 104, a shutter speed, an F value and other shooting parameters are determined by the exposure time determining section 114. As soon as these operations are finished, the exposure-image sensor displacement synchronizing section 207 which synchronizes the exposure and the image sensor displacement with each other outputs an instruction to start an exposure process to the image sensor displacement control section 206 and the shutter opening/closing instructing section 112. At the same time, according to the end position of the image sensor 104 that has been detected by the image sensor position detecting section 202, the exposure-image sensor displacement synchronizing section 207 outputs an instruction to displace the image sensor 104 either from the telephoto end to the wide angle end, or vice versa, during the exposure period to the image sensor displacement control section 206. The image sensor 104 is displaced at a constant velocity.

On receiving the instruction to start an exposure process from the exposure-image sensor displacement synchronizing section 207, the shutter opening/closing instructing section 112 performs a control so that the shutter 111 opens. Also, after a predetermined exposure period passes, the exposure-image sensor displacement synchronizing section 207 outputs an instruction to end the exposure process to the shutter opening/closing instructing section 112. On receiving the instruction to end the exposure process, the shutter opening/closing instructing section 112 performs a control so that the shutter 111 closes.

When an optical image of the subject is produced on the image sensor 104 by performing this procedure, the optical image produced is converted into an electrical signal by the image sensor 104 and the electrical signal is output to an image processing section 109 via a reading circuit 108. At the same time, the exposure-image sensor displacement synchronizing section 207 notifies the image processing section 109 that the exposure process has ended and that the displacement of the focus lens has been shot by the F-DOF method. Other than that, the image capture device 400 operates in the same way as the image capture device 300 shown in FIG. 19.

Figure 24:
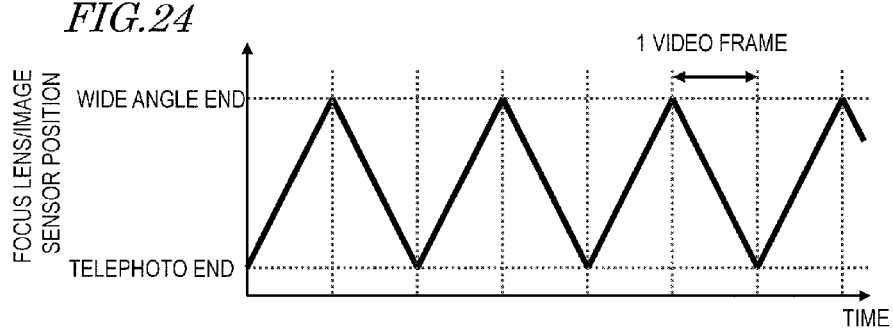
FIG. 24 shows a focus lens displacement pattern according to the F-DOF method.

By adopting such a configuration, a digital still camera or digital camcorder can make an F-DOF shooting session. In shooting a moving picture, however, the shooting session is suitably carried out continuously without causing any time lag between individual frames that form the moving picture. For that reason, by displacing the focus lens back and forth between the telephoto end and the wide angle end as shown in FIG. 24 while a moving picture is being shot and by allocating one video frame period to each of the round-trip displacements, an EDOF moving picture can be shot smoothly.

If not only such an all-in-focus image that has been obtained in this manner but also information about the depth of a scene to be shot, i.e., distance information indicating the respective positions in the depth direction of multiple subjects that are included in the scene to be shot, are available, three-dimensional information about the scene to be shot can be obtained. Various methods for measuring the distance of a subject in a scene to be shot have been proposed. Those methods are roughly classifiable into active ones by which the distance is calculated based on the amount of time it takes for the reflected wave of an infrared ray, an ultrasonic wave, or a laser beam radiated to return or on the angle of the reflected wave, and passive ones by which the distance is calculated based on the subject image. In cameras, in particular, passive methods that do not always require an apparatus for radiating an infrared ray, for example, are used extensively.

A lot of passive methods have been proposed so far. One of them is a so-called "Depth from Defocus (which will be abbreviated herein as "DFD")" method, by which the distance is measured based on the degree of image blur caused by a focus shift. According to such a method, the distance can be measured based on only a small number of images without using multiple cameras.

As a method for carrying out the DFD, a so-called "half sweep" method that uses the F-DOF described above has been proposed (see Non-Patent Document No. 2). According to this method, the focus sweep range of the F-DOF method is split into two ranges at a halfway in-focus position between the far-side focus end position (at the telephoto end) and the nearer in-focus position (at the wide angle end), and two images obtained by sweeping those two ranges are used to estimate the depth. In addition, an all-in-focus image can also be generated by using those two images at the same time. In the following description, the method for sweeping the entire range from the far-side focus end position through the nearer in-focus position as described above will be referred to herein as a "full-sweep" method for convenience sake.

Hereinafter, a method for estimating the depth by the DFD method disclosed in Non-Patent Document No. 2 will be described with reference to FIG. 25(*a*).

Figure 25:
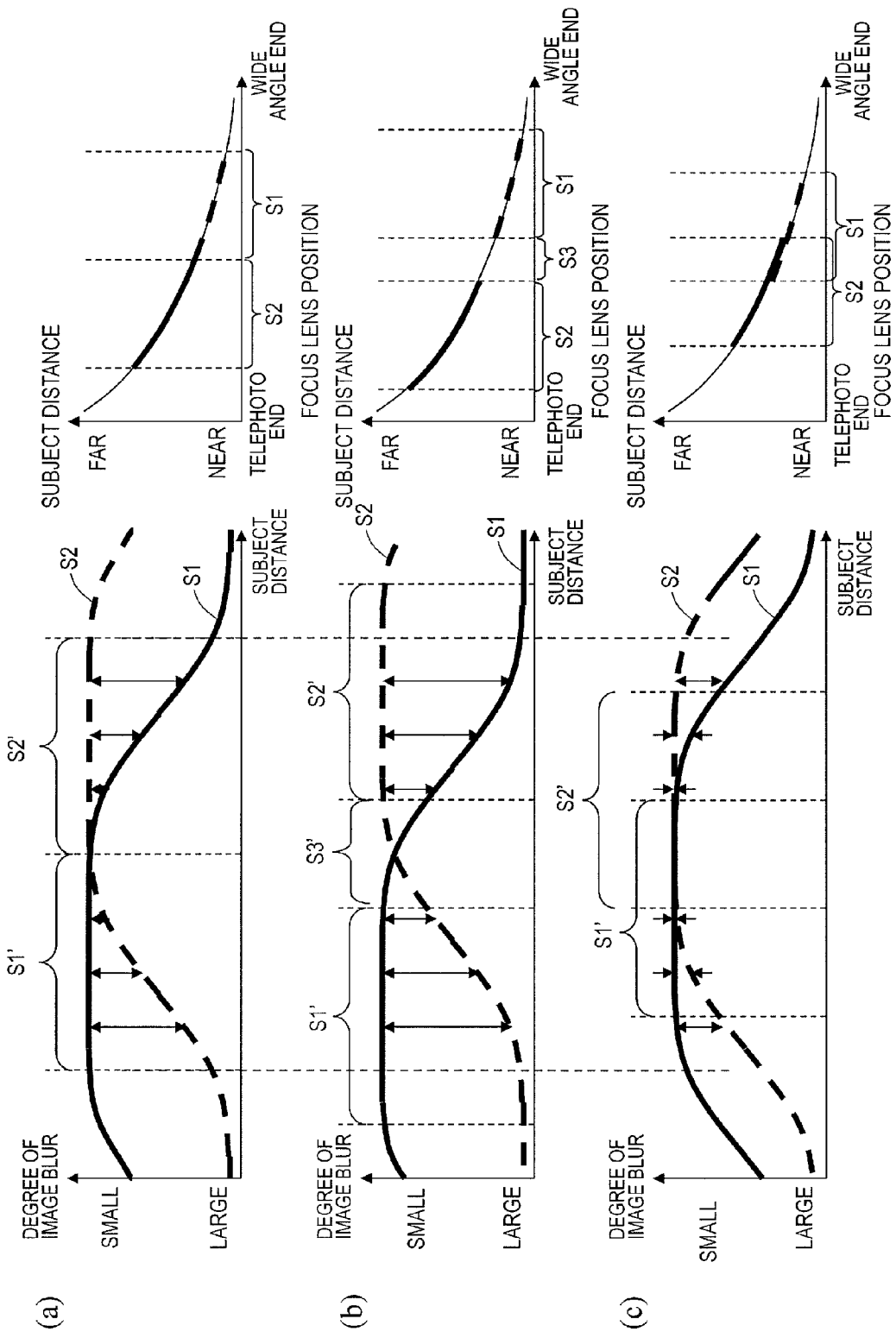
FIGS. 25($a$) to 25($c$) show relations between focus lens displacement ranges and the subject distance of an image shot and relations between the subject distance and the degree of image blur in a situation where an image is obtained by a half-sweep method, wherein 25($a$), 25($b$) and 25($c$) show results obtained when the two focus lens displacement ranges are continuous with each other, when the two displacement ranges are separate from each other, and when the two displacement ranges overlap with each other, respectively.

The graph on the right-hand side of FIG. 25(*a*) shows how the subject distance at which the subject can be in focus changes with the position of the lens in a situation where a shooting session is carried out with the in-focus position changed by the half sweep method. The range between the wide angle end and the telephoto end is split into two ranges S1 and S2 at the halfway in-focus position, and the subject is shot with the lens moved within those two ranges S1 and S2.

The graph on the left-hand side of FIG. 25(*a*) shows subjects at various distances and the degrees of image blur of those subjects that are included in the two images that have been shot as described above. Specifically, the curve S1 shows the relation of the image obtained in a situation where the focus lens is displaced within the range S1 in the graph shown on the right-hand side of FIG. 25(a). The curve S2 shows the relation of the image obtained in a situation where the focus lens is displaced within the range S2. As indicated by the curve S1, the degree of image blur of the subject that is located at a distance falling within the range S1' is relatively small and constant, which indicates the range of subjects that can be in focus when the focus lens is displaced within the range S1. In other words, a subject which is located outside of the range S1' becomes out of focus, and the farther away from the range S1' a subject is, the more blurred the subject gets. The same can be said about the curve S2. According to the DFD method, the subject distance is calculated based on these two images. In this case, the greater the difference in the degree of image blur between the two images, the more accurately the subject distance can be calculated. That is why the distance to a subject which is located in the vicinity of the boundary between the ranges S1' and S2' cannot be calculated as accurately as shown in FIG. 25(a).

Thus, to avoid such a decrease in accuracy, the applicant of the present application proposes a method for estimating the subject distance by the half-sweep method in which the displacement ranges of two focus lenses are separate from each other in PCT International Application Publication No. 2012/066774. As shown in the graph on the right-hand side of FIG. 25(b), ranges S1 and S2 are defined with another range S3 interposed between the wide angle end and the telephoto end, and the subjects are shot with the lens moves within those ranges S1 and S2.

The graph on the left-hand side of FIG. 25(b) shows subjects at various distances and the degrees of image blur of those subjects that are included in the two images that have been shot as described above. As can be seen from FIG. 25(b), since the focus lens is not at the in-focus position in the range S3' corresponding to the range S3, the degree of image blur of the subject is not constant according to any of the curves S1 and S2. In addition, in the range S3', the difference in the degree of image blur between the image represented by the curve S1' and the image represented by the curve S2' is more significant than in FIG. 25(a). That is why according to this method, the accuracy of the subject distance to be calculated can be increased in the range S3', too.

It should be noted that if the displacement ranges of the two focus lenses overlapped with each other, then the range in which the subject distance cannot be calculated accurately would expand. Thus, as can be seen from the graph shown on the right hand side of FIG. 25(c), if the ranges S1 and S2 were set so as to partially overlap with each other between the wide angle end and the telephoto end and if the subject were shot with the lens moved within each of the ranges S1 and S2, then the ranges S1' and S2' where the degrees of image blur of the two images become minimum would partially overlap with each other as can be seen from the graph shown on the left hand side of FIG. 25(c).

For these reasons, to estimate highly accurately the depth information of a scene to be shot and obtain an EDOF moving picture in a digital still camera or digital camcorder, the half-sweep method described above, in which the displacement ranges of the two focus lenses are set separately from each other, is suitably used.

Furthermore, to get an all-in-focus image of high quality using a digital camcorder while tracking a subject on the move, the displacement range of the focus lens is suitably changed as the subject moves.

In order to overcome these problems, the present inventors invented a novel image capture device which can estimate the distance to a subject (i.e., estimate the depth information of a scene to be shot) highly accurately and can obtain an EDOF moving picture in a digital still camera or a digital camcorder.

An aspect of the present invention can be outlined as follows.

An image capture device according to an aspect of the present invention includes: an image sensor which includes a plurality of photoelectric conversion elements that are arranged two-dimensionally to form an image capturing plane and which gets the plurality of photoelectric conversion elements exposed to light and reads an electrical signal from the plurality of photoelectric conversion elements, thereby generating an image signal; a lens optical system which collects light onto the image sensor and which includes a focus lens; a driving section which drives one of the image sensor and the focus lens so as to change a distance between the image sensor and the focus lens; a displacement control section which is configured to control the displacement of the one being driven according to a predetermined displacement pattern by outputting an instruction to the driving section; and a synchronizing section which is configured to control the displacement control section by reference to timing of exposure of the image sensor. The displacement range of the one includes a first range, a second range which is separated from the first range, and a third range interposed between the first and second ranges, between a first in-focus position of the focus lens or the image sensor at which a focus is set at a first subject distance in a scene to be shot and a second in-focus position of the focus lens or the image sensor at which a focus is set at a second subject distance in the scene to be shot. The predetermined displacement pattern includes first, second and third types of displacement patterns according to which one of the image sensor and the focus lens is displaced at least once in each of the entire first, second and third ranges. And one of the first and second types of displacement patterns and the third type of displacement pattern are repeated alternately.

While some of the plurality of photoelectric conversion elements which are going to form an image are being exposed to light, the one may be displaced according to the first and second types of displacement patterns. On the other hand, while those photoelectric conversion elements that are going to form an image are not being exposed to light, the one may be displaced according to the third type of displacement pattern.

Each of the first and second types of displacement patterns may include a sub-displacement pattern to displace the one at substantially a constant velocity, and the velocity according to the sub-displacement pattern of the first type of displacement pattern may be as high as the velocity according to the sub-displacement pattern of the second type of displacement pattern.

The velocity at which the one is displaced according to the third type of displacement pattern may be different from the velocity according to any of the sub-displacement patterns of the first and second types of displacement patterns.

The velocity at which the one is displaced according to the third type of displacement pattern may be higher than the velocity according to any of the sub-displacement patterns of the first and second types of displacement patterns.

According to the third type of displacement pattern, at least one displacement may be carried out in the entire range including the entire third range and at least respective parts of the first and second ranges.

According to the third type of displacement pattern, at least one displacement may be carried out in the entire range including the entire third range and all of the first and second ranges.

According to the third type of displacement pattern, a no-displacement period may be included in the third range.

Some of the photoelectric conversion elements that are going to form an image may be exposed to light in at least respective parts of periods in which the one is displaced according to the first, second and third types of displacement patterns, respectively.

The first and second types of displacement patterns may be repeated alternately with the third type of displacement pattern interposed between them.

According to the first and second types of displacement patterns, the one may make at least one round trip through each of the entire first and second ranges.

As the first, second and third types of displacement patterns are repeated, the first, second and third ranges may change their locations.

As the first, second and third types of displacement patterns are repeated, the first and second ranges may keep having the same length but may change their locations between the first and second in-focus positions.

The image capture device may further include: an exposure time determining section which determines the exposure time of the image sensor according to a scene to be shot; and a displacement setting section which determines the displacement pattern based on the first and second in-focus positions and the exposure time.

The image capture device may further include a position detecting section which detects the position of one of the image sensor and the focus lens, and the displacement control section may instruct the driving section how much to drive based on the output of the position detecting section and the displacement pattern.

The image capture device may further include a reading circuit which reads the image signal from the image sensor, and the synchronizing section may control the displacement control section and the reading circuit by reference to the timing of exposure of the image sensor.

The image sensor may be a CCD image sensor.

The image sensor may be a CMOS image sensor.

According to each of the first and second types of displacement patterns, roundtrip displacements may be carried out at least twice, or any other larger integral number of times, all through the entire displacement range.

An integrated circuit according to an aspect of the present invention is used in an image capture device. The image capture device includes: an image sensor which includes a plurality of photoelectric conversion elements that are arranged two-dimensionally to form an image capturing plane and which gets the plurality of photoelectric conversion elements exposed to light and reads an electrical signal from the plurality of photoelectric conversion elements, thereby generating an image signal; a lens optical system which collects light onto the image sensor and which includes a focus lens; and a driving section which drives one of the image sensor and the focus lens so as to change a distance between the image sensor and the focus lens. The integrated circuit includes: a displacement control section which is configured to control the displacement of the one being driven according to a predetermined displacement pattern by outputting an instruction to the driving section; and a synchronizing section which is configured to control the displacement control section by reference to timing of exposure of the image sensor. The displacement range of the image sensor or the focus lens includes a first range, a second range which is separated from the first range, and a third range interposed between the first and second ranges, between a first in-focus position of the focus lens or the image sensor at which a focus is set at a first subject distance in a scene to be shot and a second in-focus position of the focus lens or the image sensor at which a focus is set at a second subject distance in the scene to be shot. The predetermined displacement pattern includes first, second and third types of displacement patterns according to which one of the image sensor and the focus lens is displaced at least once in each of the entire first, second and third ranges. While some of the plurality of photoelectric conversion elements which are going to form an image are being exposed to light, the one is displaced according to the first and second types of displacement patterns. On the other hand, while those photoelectric conversion elements that are going to form an image are not being exposed to light, the one is displaced according to the third type of displacement pattern.

In an image capturing method according to an aspect of the present invention, light is collected through a focus lens onto an image sensor, which includes a plurality of photoelectric conversion elements that are arranged two-dimensionally to form an image capturing plane and which gets the plurality of photoelectric conversion elements exposed to light and reads an electrical signal from the plurality of photoelectric conversion elements to generate an image signal, thereby getting the plurality of photoelectric conversion elements exposed to light while displacing either the focus lens or the image sensor and imaging a scene to be shot. The displacement range of the image sensor or the focus lens includes a first range, a second range which is separated from the first range, and a third range interposed between the first and second ranges, between a first in-focus position of the focus lens or the image sensor at which a focus is set at a first subject distance in a scene to be shot and a second in-focus position of the focus lens or the image sensor at which a focus is set at a second subject distance in the scene to be shot. The predetermined displacement pattern includes first, second and third types of displacement patterns according to which one of the image sensor and the focus lens is displaced at least once in each of the entire first, second and third ranges. While some of the plurality of photoelectric conversion elements which are going to form an image are being exposed to light, the one is displaced according to the first and second types of displacement patterns. On the other hand, while those photoelectric conversion elements that are going to form an image are not being exposed to light, the one is displaced according to the third type of displacement pattern.

Hereinafter, embodiments of an image capture device, integrated circuit and image capturing method according to the present invention will be described in detail with reference to the accompanying drawings. In the following description, any pair of components having substantially the same function will be identified by the same reference numeral. And once such a component has been described, the description of its counterpart will be sometimes omitted herein.

(Embodiment 1)

Hereinafter, a first embodiment of an image capture device, integrated circuit and image capturing method according to the present invention will be described with reference to the accompanying drawings.

Figure 1:
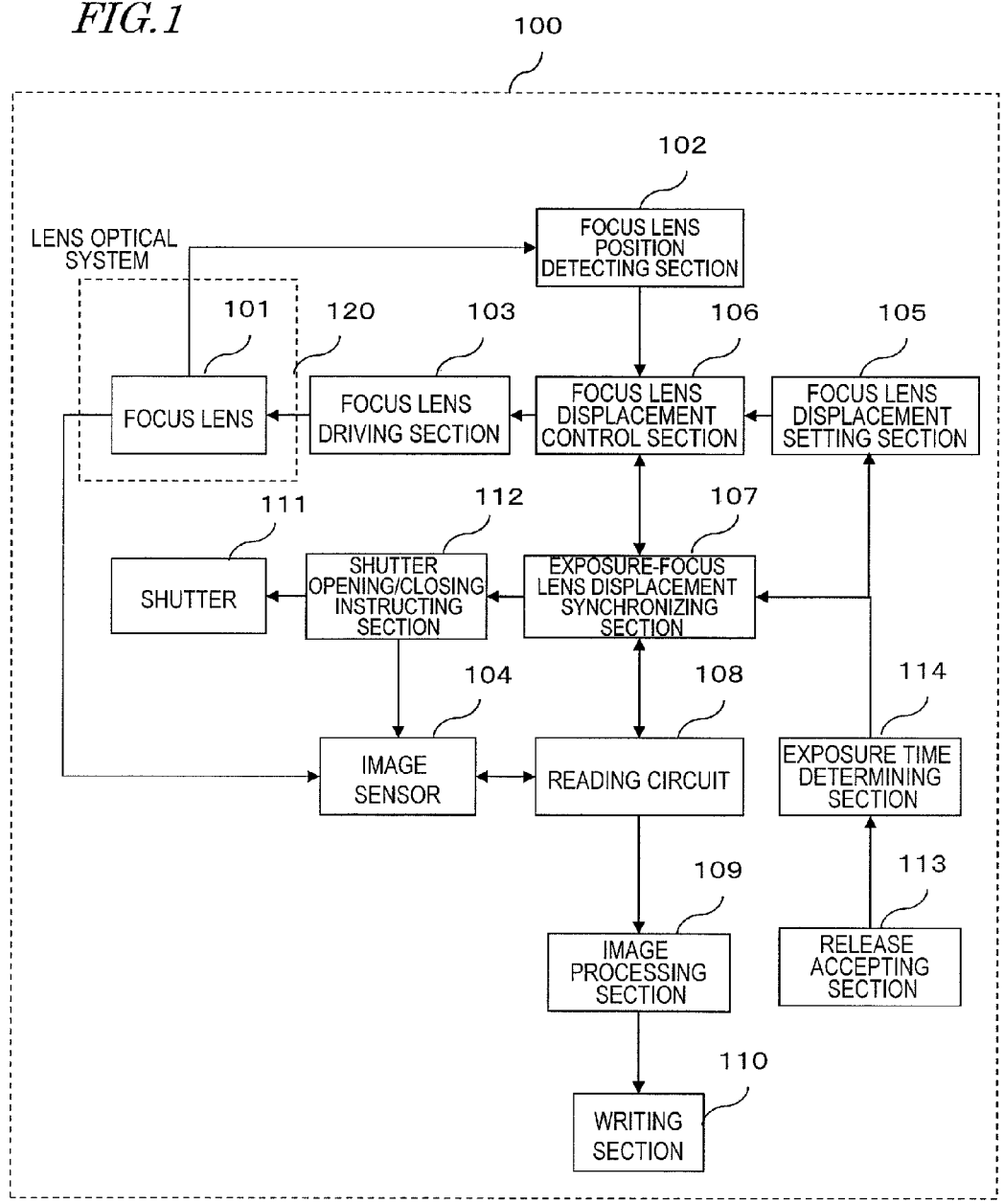
FIG. 1 is a block diagram illustrating a configuration for image capture devices according to first and third embodiments.

FIG. 1 is a block diagram illustrating a configuration for an image capture device 100 as a first embodiment. The image capture device 100 includes a focus lens driving section 103, an image sensor 104, a focus lens displacement control section 106, an exposure-focus lens displacement synchronizing section 107, and a lens optical system 120.

The image sensor 104 may be a CCD image sensor in this embodiment, and includes a plurality of photoelectric conversion elements that are arranged two-dimensionally to form an image capturing plane. The image sensor 104 gets the plurality of photoelectric conversion elements exposed to light and reads an electrical signal from the plurality of photoelectric conversion elements, thereby generating an image signal;

The lens optical system 120 includes a focus lens 101 which collects light onto the image sensor 104 and which images a scene to be shot on the image sensor 104. To set focus on any intended subject in the scene to be shot, the lens optical system 120 may include not only the focus lens 101 but also at least one more lens as well. The focus lens 101 itself may also be made up of multiple lenses as well. If the focus lens 101 is made up of multiple lenses, the position of the focus lens will refer herein to the position of the principal point formed by those lenses.

In this embodiment, the focus lens driving section 103 functions as a driving section to drive either the image sensor 104 or the focus lens 101 so as to change the distance between the image sensor 104 and the focus lens 101. That is to say, the focus lens driving section 103 drives the focus lens 101 so that the distance between the image sensor 104 and the focus lens 101 changes in response to a drive signal.

As will be described later, the focus lens displacement control section 106 is configured to control the displacement of the focus lens 101 according to a predetermined displacement pattern by giving an instruction to the focus lens driving section 103.

The exposure-focus lens displacement synchronizing section 107 is configured to control the focus lens displacement control section 106 at the timing of exposing the image sensor 104 to light.

The image capture device 100 further includes a focus lens position detecting section 102, a focus lens displacement setting section 105, a reading circuit 108, an image processing section 109, a writing section 110, a shutter 111, a shutter opening/closing instructing section 112, a release accepting section 113, and an exposure time determining section 114.

The focus lens position detecting section 102 includes a position sensor, and detects the position of the focus lens 101 and outputs a detection signal to the focus lens displacement control section 106. The focus lens displacement setting section 105 sets a displacement pattern for the focus lens 101 and also sets a target position for the focus lens. As a result, the focus lens displacement control section 106 calculates a drive signal based on the difference between the target position of the focus lens and current position of the focus lens 101 that has been detected by the focus lens position detecting section 102 and outputs the drive signal to the focus lens driving section 103.

When the release accepting section 113 accepts a user's instruction to start exposure, the exposure time determining section 114 determines the exposure time of the image sensor 104, and provides information about the exposure time for the exposure-focus lens displacement synchronizing section 107 and the focus lens displacement setting section 105.

The exposure-focus lens displacement synchronizing section 107 outputs instructions to the shutter opening/closing instructing section 112, the focus lens displacement control section 106 and the reading circuit 108 so that the exposure process, driving the focus lens 101 and reading an electrical signal from the image sensor 104 are synchronized together in accordance with information about the exposure time. More specifically, the exposure-focus lens displacement synchronizing section 107 gives an instruction on the exposure timing and exposure time to the shutter opening/closing instructing section 112. In addition, the exposure-focus lens displacement synchronizing section 107 gives an instruction on the timing to drive the focus lens 101 and the driving time to the focus lens displacement control section 106.

The shutter 111 opens and closes in accordance with the instruction given by the shutter opening/closing instructing section 112. When the shutter 111 is open, the image sensor 104 is exposed to the light that has been collected by the focus lens 101 and the exposing light is converted into an electrical signal, which is then output. Also, as will be described later, the image sensor 104 includes an electronic shutter, of which the open and closed states are controlled in accordance with the instruction given by the shutter opening/closing instructing section 112.

The reading circuit 108 outputs a readout signal to the image sensor 104 to read the electrical signal and outputs the electrical signal thus read to the image processing section 109.

The image processing section 109 performs various kinds of corrections on the input electrical signal to compose sequentially an image signal that forms an image representing a scene to be shot that corresponds to one video frame and outputs the image signal to the writing section 110. Also, as will be described later, the image processing section 109 may also estimate the distance to the subject.

As a result, the image capture device 100 can get the image sensor 104 exposed to light while changing the position of the focus lens by driving the focus lens 101, thereby obtaining a half-sweep image.

Among the various components of the image capture device 100 described above, the focus lens position detecting section 102, the focus lens driving section 103, the image sensor 104, the image processing section 109, the release accepting section 113, and the writing section 110 may be implemented as known hardware components. On the other hand, the components of the focus lens displacement setting section 105, the focus lens displacement control section 106, the exposure-focus lens displacement synchronizing section 107, the reading circuit 108, the image processing section 109, the writing section 110, the shutter opening/closing instructing section 112 and the exposure time determining section 114 may be implemented either partially or entirely as a combination of an information processor such as a CPU and a software program stored in a storage section such as a memory. In that case, the information processor retrieves a software program defining the procedure of an image capturing method to be described later from the memory and carries out the procedure of the image capturing method, thereby controlling the respective components of the image capture device 100. Alternatively, some of those components to be implemented as a combination of an information processor and a software program stored in a memory may also be implemented as a dedicated integrated circuit. For example, the focus lens displacement setting section 105, the focus lens displacement control section 106, the exposure-focus lens displacement synchronizing section 107 and the shutter opening/closing instructing section 112 may form an integrated circuit together.

Hereinafter, it will be described with reference to FIGS. 1, 2, 3 and 4 where the focus lens should be positioned and when the image sensor 104 should get exposed to light and read signals in order to get an image by the image capturing method of this embodiment (by the half-sweep method, in particular).

Figure 2:
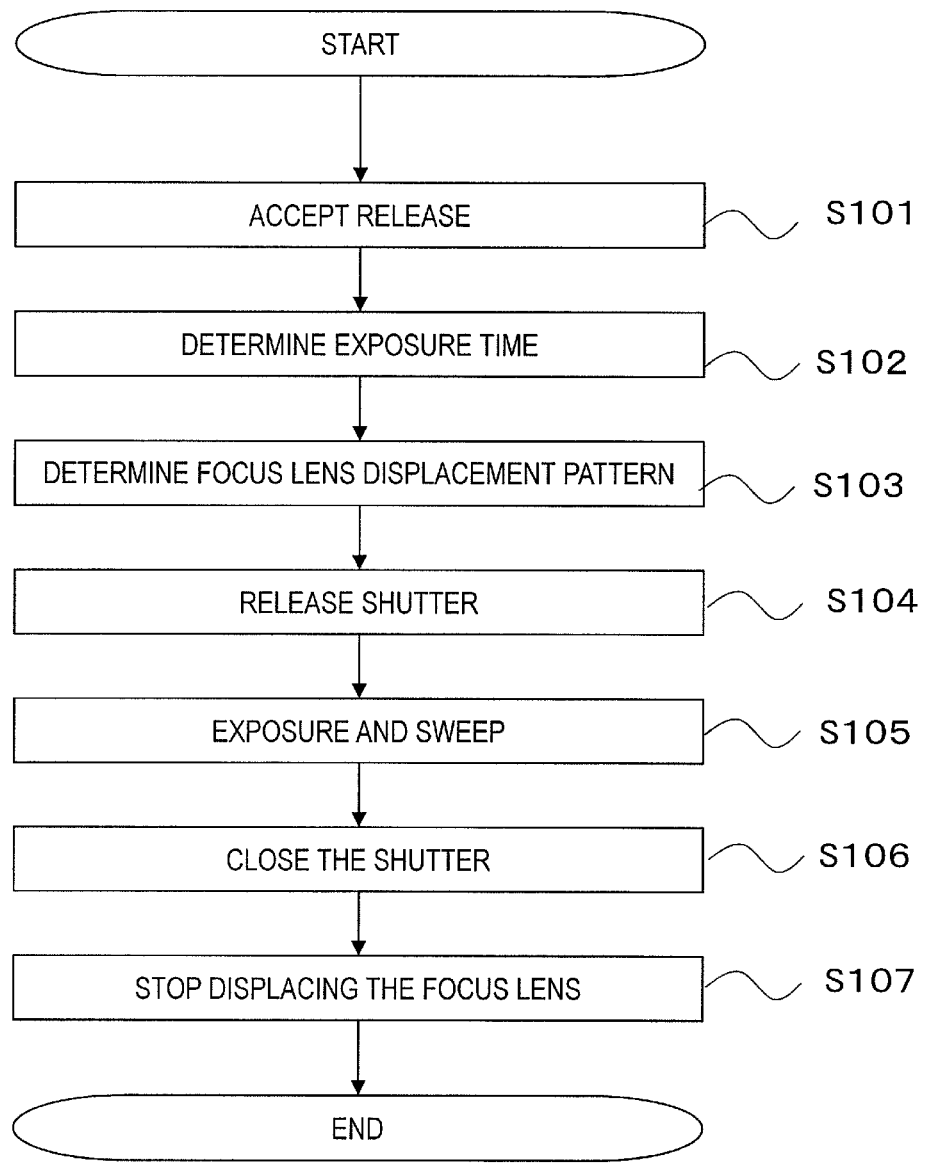
FIG. 2 is a flowchart showing how the image capture devices according to the first and third embodiments operate.

FIG. 2 is a flowchart showing the image capturing method of this embodiment. First of all, when a user's release operation is accepted in Step S101, the exposure time determining section 114 determines exposure time parameters based on a shutter speed, an F value and other shooting parameters in Step S102. The exposure time parameters are output to the focus lens displacement setting section 105 and the exposure-focus lens displacement synchronizing section 107.

Next, based on the exposure time parameters determined, the focus lens displacement setting section 105 generates a focus lens position displacement pattern in Step S103. The displacement pattern will be described in detail later.

After the focus lens position displacement pattern has been determined, the exposure-focus lens displacement synchronizing section 107 outputs instructions to the shutter opening/closing instructing section 112, the focus lens displacement setting section 105 and the reading circuit 108 so that the focus lens displacement setting section 105 and the reading circuit 108 operate at the timing of exposure of the image sensor 104. In response to the instruction, the shutter opening/closing instructing section 112 releases the shutter 111 (in Step S104), thereby starting to get the image sensor 104 exposed to light. Synchronously with the start of the exposure, the focus lens driving section 103 displaces the focus lens 101 in accordance with the instruction given by the focus lens displacement control section 106 (in Step S105). In this description, "to be synchronous" naturally refers herein to a situation where two operations are synchronized together but may also refer to a situation where there is a certain amount of delay between the two operations. Also, at a predetermined timing which is synchronous with the displacement of the focus lens 101, an electrical signal forming an image of a scene to be shot is output from the image sensor 104 to the reading circuit 108. Also, in accordance with the instruction given by the shutter opening/closing instructing section 112, the electronic shutter of the image sensor 104 is opened and closed, thus controlling the exposure of the image sensor 104.

When an image gets shot, the shutter 111 is closed (in Step S106) and the focus lens displacement is stopped (in Step S107) to end the shooting session. In shooting a moving picture, the exposure and sweep operations may be continued until the user enters an instruction to stop recording. In this manner, a half-sweep image can be obtained continuously and the moving picture can be shot continuously.

Next, the exposure and sweep operation will be described in detail with reference to FIGS. 3 and 4.

Figure 3:
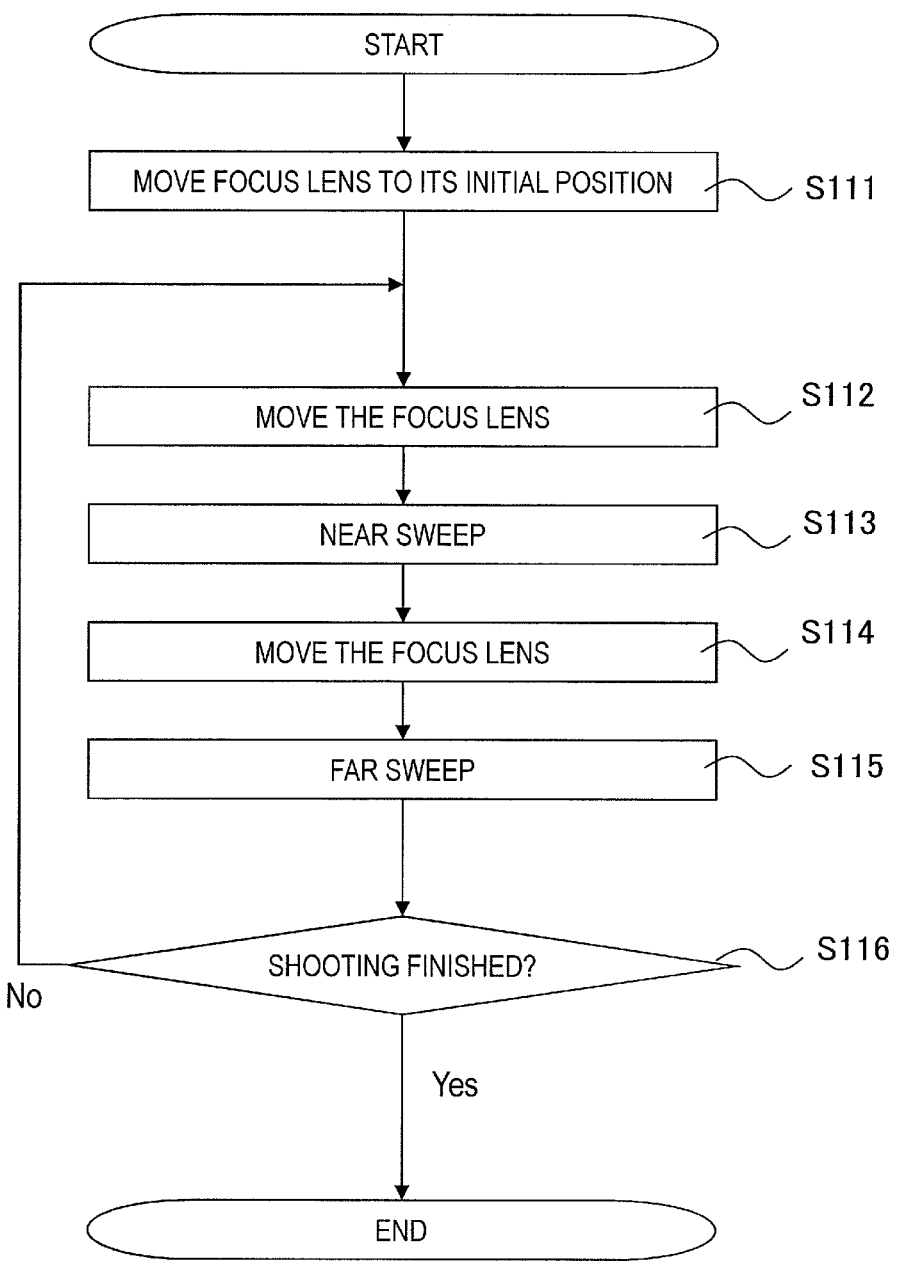
FIG. 3 is a flowchart showing a detailed procedure of the exposure and sweep processing step shown in FIG. 2.

FIG. 3 is a flowchart showing how the sweep operation is performed at the time of shooting. The upper portion of FIG. 4 shows how the focus lens changes its position when displaced between the telephoto end and the wide angle end (i.e., a sweep pattern (or displacement pattern)). On the other hand, the lower portion of FIG. 4 indicates the timing of exposure of the image sensor 104. In the upper portion of FIG. 4, the abscissa indicates the time and the ordinate indicates the position of the focus lens (i.e., distance from the image sensor). Also, in the upper portion of FIG. 4, the solid line indicates the displacement patterns of the half-sweep (as first and second types of displacement patterns), and the dotted line indicates the pattern of the displacement during non-exposure to be carried out between the displacement patterns of the half-sweep (as a third type of displacement pattern).

As already described with reference to FIG. 25(b), the image capture device of this embodiment adopts a half-sweep method in which the two focus lens displacement ranges are separated from each other in order to estimate the distance from an image shot to the subject accurately. More specifically, between the telephoto end and the wide angle end that are the respective positions of the focus lens, a first range S1, a second range S2 which is separated from the first range S1, and a third range S3 interposed between the first and second ranges S1 and S2 are set. In each of these ranges, the focus lens is displaced in a predetermined displacement pattern. It should be noted that the focus lens is displaced within the first and second ranges S1 and S2 while the photoelectric conversion elements forming an image are exposed to light, and is displaced in the third range while the photoelectric conversion elements are not exposed to light. In this description, "while the photoelectric conversion elements forming an image are exposed to light" refers herein to a portion of one field period in which the photoelectric conversion elements are irradiated with light and the image sensor is exposed to light in order to generate an electrical signal to produce an image by photoelectric conversion. On the other hand, "while the photoelectric conversion elements are not exposed to light (non-exposure period)" refers herein to the rest of one field period other than the period in which the image sensor is exposed to light to generate an electrical signal to produce an image. The non-exposure period includes an exposure period in which photoelectric conversion elements are exposed to light by electronic shuttering but in which an electrical signal generates is discarded so as to avoid contributing to an electrical signal to produce an image.

Figure 4:
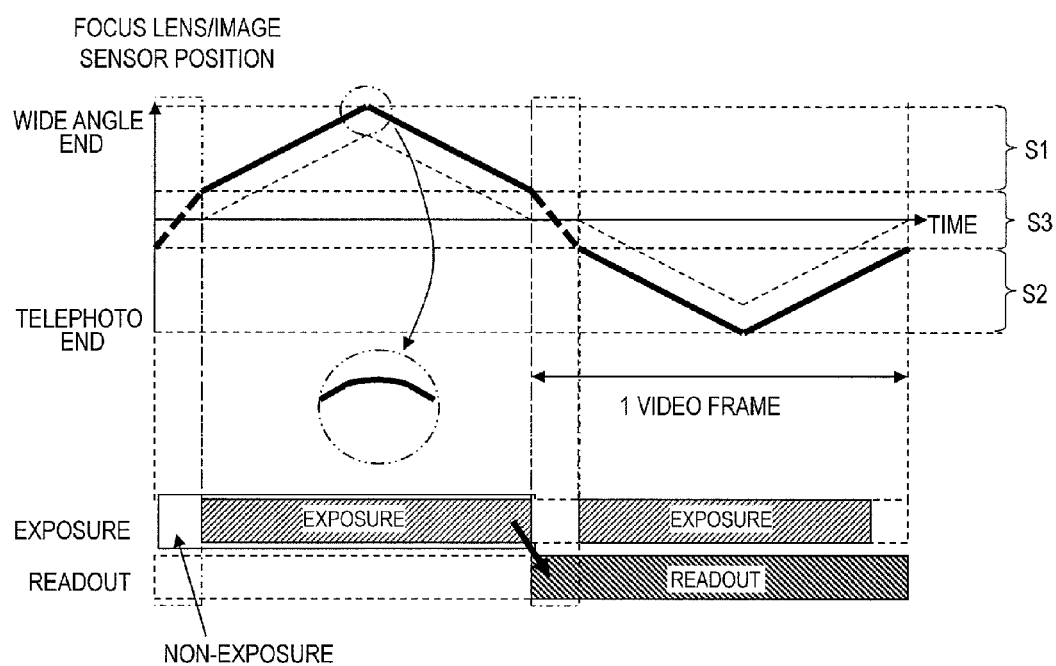
FIG. 4 shows an exemplary displacement pattern and exemplary timing of exposure for a focus lens or image sensor according to the first and second embodiments.

As shown in FIG. 4, the third range is set so as to cover the halfway position between the telephoto end and the wide angle end. The first and second ranges may have different lengths but suitably have approximately the same length. Also, it is recommended that the third range be shorter than the first and second ranges. Furthermore, it is recommended that the first, second and third ranges be in contact and continuous with each other.

As described above, the telephoto end refers herein to the position of the focus lens 101 which has been moved so that in a scene to be shot including multiple subjects at various distances from the image capture device, a number of subjects falling within a predetermined distance range are in focus on the image capturing plane of the image sensor 104 and that an image of a subject which is located farthest away from the image capture device is produced on the image capturing plane. On the other hand, the wide angle end refers herein to the position of the focus lens 101 which has been moved so that an image of a subject which is located nearest to the image capture device is produced on the image capturing plane of the image sensor 104. The subject which is imaged at the telephoto end (i.e., at a first in-focus position) is located at the longest distance from the image capture device within the predetermined distance range (i.e., located at the first subject distance). On the other hand, the subject which is imaged at the wide angle end (i.e., at a second in-focus position) is located at the shortest distance from the image capture device within the predetermined distance range (i.e., located at the second subject distance).

As shown in FIGS. 3 and 4, first of all, the focus lens driving section 103 moves the focus lens 101 to its initial position in accordance with an instruction given by the focus lens displacement control section 106 (in Step S111). In this embodiment, the focus lens is moved toward a part of the third range S3 that is closer to the telephoto end.

Next, according to the third type of displacement pattern, the focus lens 101 is displaced from that part of the third range S3 closer to the telephoto end toward another part of the third range S3 closer to the wide angle end (in Step S112). In the meantime, processing is carried out so as to prevent light that has been incident on the photoelectric conversion elements from contributing to generating an electrical signal to produce an image by electronic shuttering, for example. As a result, the focus lens 101 is moved to a part of the first range S1 closer to the telephoto end without producing an image.

Subsequently, according to the first type of displacement pattern, the focus lens 101 is displaced within the first range S1 (in Step S113). In this embodiment, the image sensor 104 is a CCD and is exposed to light through a global shutter. That is why if the focus lens 101 moves through the entire first range S1 at least once, a uniform half-sweep image can be obtained. However, in this embodiment, with the move to the next displacement range (i.e., the second range S2) of the focus lens 101 taken into account, the focus lens 101 is displaced so as to move toward the wide angle end and then go back to the telephoto end of the first range S1 again (i.e., to make a round trip in the first range S1). In the meantime, processing is carried out so as to get the light that has been incident on the photoelectric conversion elements converted into an electrical signal to produce an image by electronic shuttering, for example. In this manner, a half-sweep image can be obtained. As shown in FIG. 4, the electric charges that have been stored in the photoelectric conversion elements of the image sensor 104 through the exposure process are transferred at a time from all pixels but the electric charges transferred will be sequentially extracted one after another. This reading will be carried out in the next frame, for example.

Thereafter, according to a modified third type of displacement pattern, the focus lens 101 is displaced from that part of the third range S3 closer to the wide angle end toward another part of the third range S3 closer to the telephoto end (in Step S114). In the meantime, processing is carried out so as to prevent light that has been incident on the photoelectric conversion elements from contributing to generating an electrical signal to produce an image by electronic shuttering, for example. As a result, the focus lens 101 is moved to a part of the second range S2 closer to the wide angle end without producing an image.

Subsequently, according to the second type of displacement pattern, the focus lens 101 is displaced within the second range S2 (in Step S115). As described above, if the focus lens 101 moves through the entire second range S2 at least once, a uniform half-sweep image can be obtained. However, in this embodiment, with the move to the next displacement range (i.e., the first range S1) of the focus lens 101 taken into account, the focus lens 101 is displaced so as to move toward the telephoto end and then go back to the wide angle end of the second range S2 again (i.e., to make a round trip in the second range S2). In the meantime, processing is carried out so as to get the light that has been incident on the photoelectric conversion elements converted into an electrical signal to produce an image by electronic shuttering, for example. In this manner, a half-sweep image can be obtained.

By performing this series of processing steps S112 to S115, one period of the focus lens sweep operation according to this embodiment is completed. To shoot a moving picture, this series of operations may be performed repeatedly. Specifically, the first type of displacement pattern to displace the focus lens 101 in the first range and the second type of displacement pattern to displace it in the second range S2 may be repeated alternately with the third and modified third types of displacement patterns to displace it in the third range interposed. In that case, the displacement pattern to displace it in the third range is not a roundtrip pattern, and therefore, the displacement from the first range toward the second range (i.e., the modified third type of displacement pattern) and the displacement from the second range toward the first range (i.e., the third type of displacement pattern) have opposite displacement patterns. By seeing if the user has entered an instruction to end shooting (in Step S6), the sweep operation is ended if the answer is YES.

As shown in FIG. 4, the first type of displacement pattern to displace the focus lens in the first range includes a sub-displacement pattern to displace the focus lens 101 at substantially a constant velocity from the telephoto end to the wide angle end in the first range and a sub-displacement pattern to displace the focus lens 101 at substantially a constant velocity from the wide angle end to the telephoto end in the first range. Likewise, the second type of displacement pattern to displace the focus lens in the second range includes a sub-displacement pattern to displace the focus lens 101 at substantially a constant velocity from the wide angle end to the telephoto end in the second range and a sub-displacement pattern to displace the focus lens 101 at substantially a constant velocity from the telephoto end to the wide angle end in the second range. The velocity of the focus lens 101 in the sub-displacement pattern in the first range is as high as the velocity in the sub-displacement pattern in the second range. As a result, subjects at various distances within the respective ranges can be exposed to light uniformly. In addition, two half-sweep images are also exposed to light to the same degree.

On the other hand, the displacement velocity of the focus lens 101 in the third and modified third types of displacement patterns to displace it in the third range has nothing to do with the exposure. That is why the displacement velocity of the focus lens 101 in the third and modified third types of displacement patterns does not have to be constant and may be different from the displacement velocity of the focus lens 101 in the first and second types of displacement patterns. Nevertheless, since the displacement of the focus lens 101 in the third range has nothing to do with generating a half-sweep image, the shorter the time it takes for the focus lens 101 to go through the third range, the higher the frame rate of the image capture device can be. That is why the displacement velocity of the focus lens 101 in the third and modified third types of displacement patterns is suitably higher than that of the focus lens 101 in the first and second types of displacement patterns. Since the displacement velocity of the focus lens 101 does not have to be constant in the third range as described above, the displacement velocity of the focus lens 101 may be higher in at least a part of the third range than in the first and second ranges. The third type of displacement pattern shown in FIG. 4 includes a sub-displacement pattern to displace the focus lens 101 at substantially a constant velocity from a part of the third range closer to the telephoto end toward another part thereof closer to the wide angle end. The modified third type of displacement pattern includes a sub-displacement pattern to displace the focus lens 101 at substantially a constant velocity from the part of the third range closer to the wide angle end toward the part thereof closer to the telephoto end.

As indicated by the one-dot chain circle in FIG. 4, if it is not easy to control the displacement of the focus lens so that its velocity changes steeply at the boundary between the first, second and third ranges or if the velocity should not change steeply considering the structure of the device, then the displacement pattern at the boundary may be linked with a sinusoidal wave curve or a quadratic function curve so as to change the velocity smoothly, as indicated in the partially enlarged portion in FIG. 4.

A method for estimating information about the subject distance based on a half-sweep image thus obtained is just as already described with reference to FIG. 25(b) and is as disclosed in detail in Non-Patent Document No. 2.

As can be seen, according to this embodiment, half-sweep images are obtained by driving the focus lens in two separate ranges, and information about the subject distance is calculated based on the half-sweep images thus obtained. As a result, the subject distance can be estimated highly accurately. In addition, by increasing the displacement velocity of the focus lens in the range interposed between the two separate ranges, the displacement time of the focus lens that does not contribute to exposure can be shortened. Consequently, the frame rate of the image capture device can be increased.

Although the focus lens starts to be displaced in the third range S3 in the embodiment described above, the focus lens may also start to be displaced in the first range S1 or in the second range S2 as well.

Optionally, a sweep image for the entire range may be generated by synthesizing two half-sweep images together. In that case, since no image is obtained in the third range between the first and second ranges while displacing the focus lens, a sweep image for the entire range cannot be generated in a strict sense. Nevertheless, as the degree of image blur of the subject is small in the vicinity of the first or second range as shown in FIG. 25(b), an image, of which the quality is high enough to be regarded as substantially a sweep image for the entire range, can be obtained.

Moreover, information about the subject distance may also be calculated by any signal processing section other than the image processing section 109, e.g., by an external computer or signal processing section outside of the image capture device 100.

(Embodiment 2)

Hereinafter, a second embodiment of an image capture device, integrated circuit and image capturing method according to the present invention will be described with reference to FIGS. 5 and 6.

Figure 5:
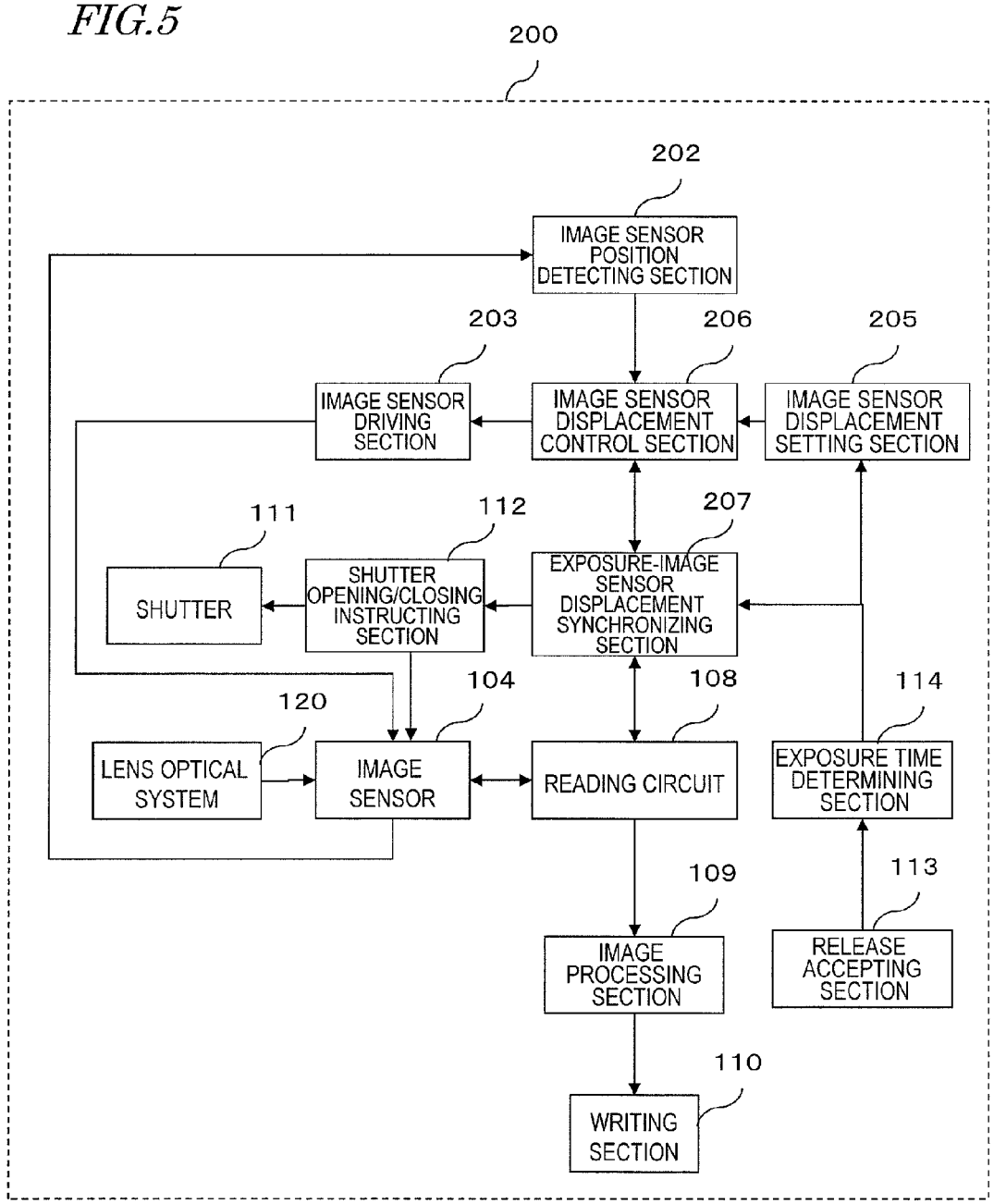
FIG. 5 is a block diagram illustrating a configuration for an image capture device according to the second embodiment.

FIG. 5 is a block diagram illustrating a configuration for an image capture device 200 according to this embodiment. In FIG. 5, any component also included in the image capture device 100 of the first embodiment and having substantially the same function as its counterpart is identified by the same reference numeral. This image capture device 200 changes the distance from the focus lens 101 of the lens optical system 120 by moving the image sensor 104, which is different from the image capture device 100.

For that purpose, this image capture device 200 includes an image sensor position detecting section 202, an image sensor driving section 203, an image sensor displacement setting section 205, an image sensor displacement control section 206, and an exposure-image sensor displacement synchronizing section 207.

The image sensor position detecting section 202 includes a position sensor, and detects the position of the image sensor 104 and outputs a detection signal to the image sensor displacement control section 206. The image sensor displacement setting section 205 sets a displacement pattern for the image sensor 104 and also sets a target position for the image sensor. As a result, the image sensor displacement control section 206 calculates a drive signal based on the difference between the target position of the image sensor and current position of the image sensor 104 that has been detected by the image sensor position detecting section 202 and outputs the drive signal to the image sensor driving section 203.

When the release accepting section 113 accepts a user's instruction to start exposure, the exposure time determining section 114 determines the exposure time of the image sensor 104, and provides information about the exposure time for the exposure-image sensor displacement synchronizing section 207.

The exposure-image sensor displacement synchronizing section 207 outputs instructions to the shutter opening/closing instructing section 112, the image sensor displacement control section 206 and the reading circuit 108 so that the exposure process, driving the image sensor 104 and reading an electrical signal from the image sensor 104 are synchronized together in accordance with information about the exposure time. More specifically, the exposure-image sensor displacement synchronizing section 207 gives an instruction on the exposure timing and exposure time to the shutter opening/closing instructing section 112. In addition, the exposure-image sensor displacement synchronizing section 207 gives an instruction on the timing to drive the image sensor 104 and the driving time to the image sensor displacement control section 206. As a result, the image capture device 200 can get the image sensor 104 exposed to light while changing the position of the image sensor by driving the image sensor 104, thereby obtaining a half-sweep image.

Figure 6:
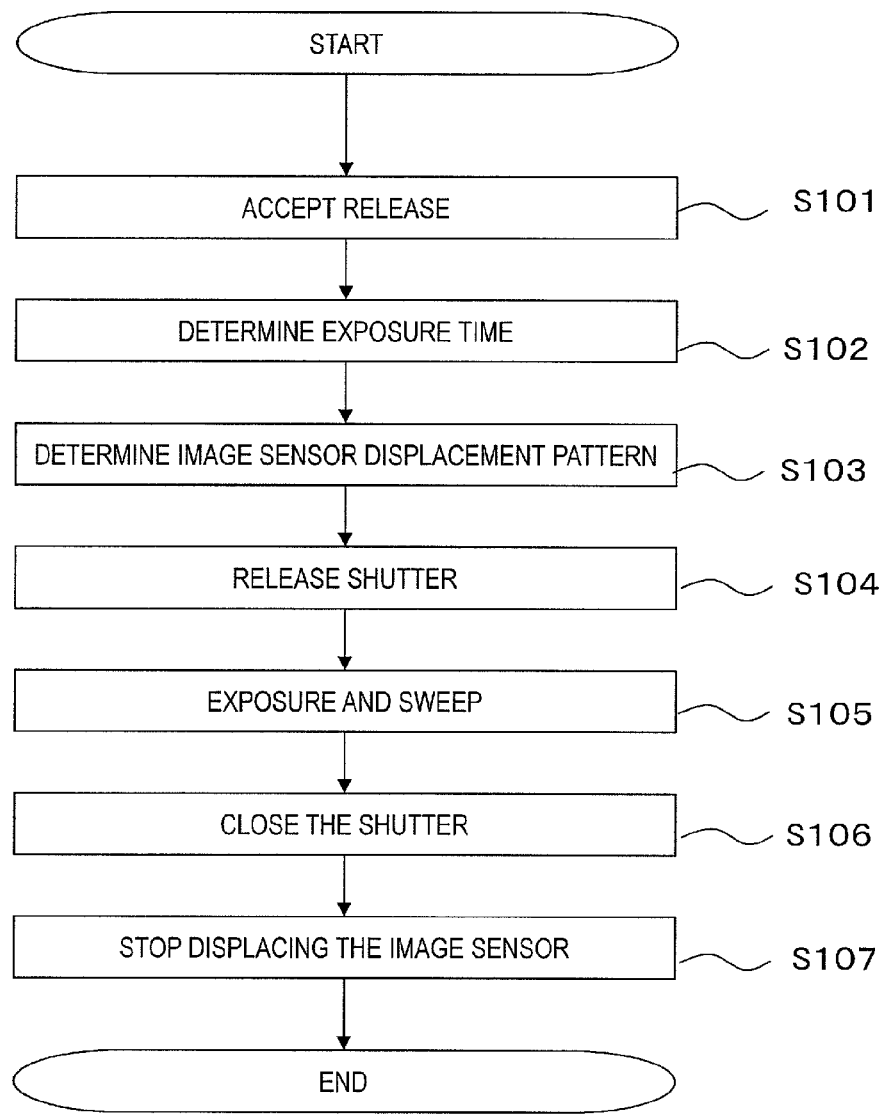
FIG. 6 is a flowchart showing how the image capture device according to the second embodiment operates.

FIG. 6 is a flowchart showing the procedure of an image capturing method according to this embodiment. This image capturing method is the same as the image capturing method of the first embodiment that has already been described with reference to FIG. 2, except that the image sensor is displaced in order to change the distance between the image sensor and the focus lens.

The displacement pattern of the image sensor is the same as that of the focus lens that has already been described for the first embodiment with reference to FIG. 4.

As can be seen, even if such a configuration for changing the position of the image sensor by driving the image sensor is adopted, the subject distance can also be estimated as accurately as in the first embodiment.

(Embodiment 3)

The image capture devices of the first and second embodiments use a CCD image sensor as their image sensor. As a CCD image sensor can perform a global shutter operation, by which all pixels can be scanned at the same time, the focus lens displacement pattern for the image capture devices of the first and second embodiments is also suitable for a CCD image sensor. In the following description, an image capture device, integrated circuit and image capturing method which uses a CMOS image sensor as its image sensor will be described as a third embodiment. The image capture device of this embodiment has the same overall configuration and operates in the same way as the image capture device of the first embodiment described above, and just uses a different image sensor. Thus, the following description of this embodiment will be mainly focused on the difference in displacement pattern to be used by such a different image sensor.

An image sensor implemented as a CMOS image sensor can be used effectively to scan a lot of pixels at high speeds. For example, an image sensor which can read 60 frames per minute of an image with a full HD (1920×1080) size has been realized.

If electric charges obtained by exposing an image sensor implemented as a CMOS image sensor to light need to be extracted continuously, a so-called "rolling shutter" electronic shutter control method, in which a set of pixels arranged two-dimensionally are sequentially scanned on a part (such as a row) basis and then the electric charges are extracted from the respective pixels, may be used.

Figure 7:
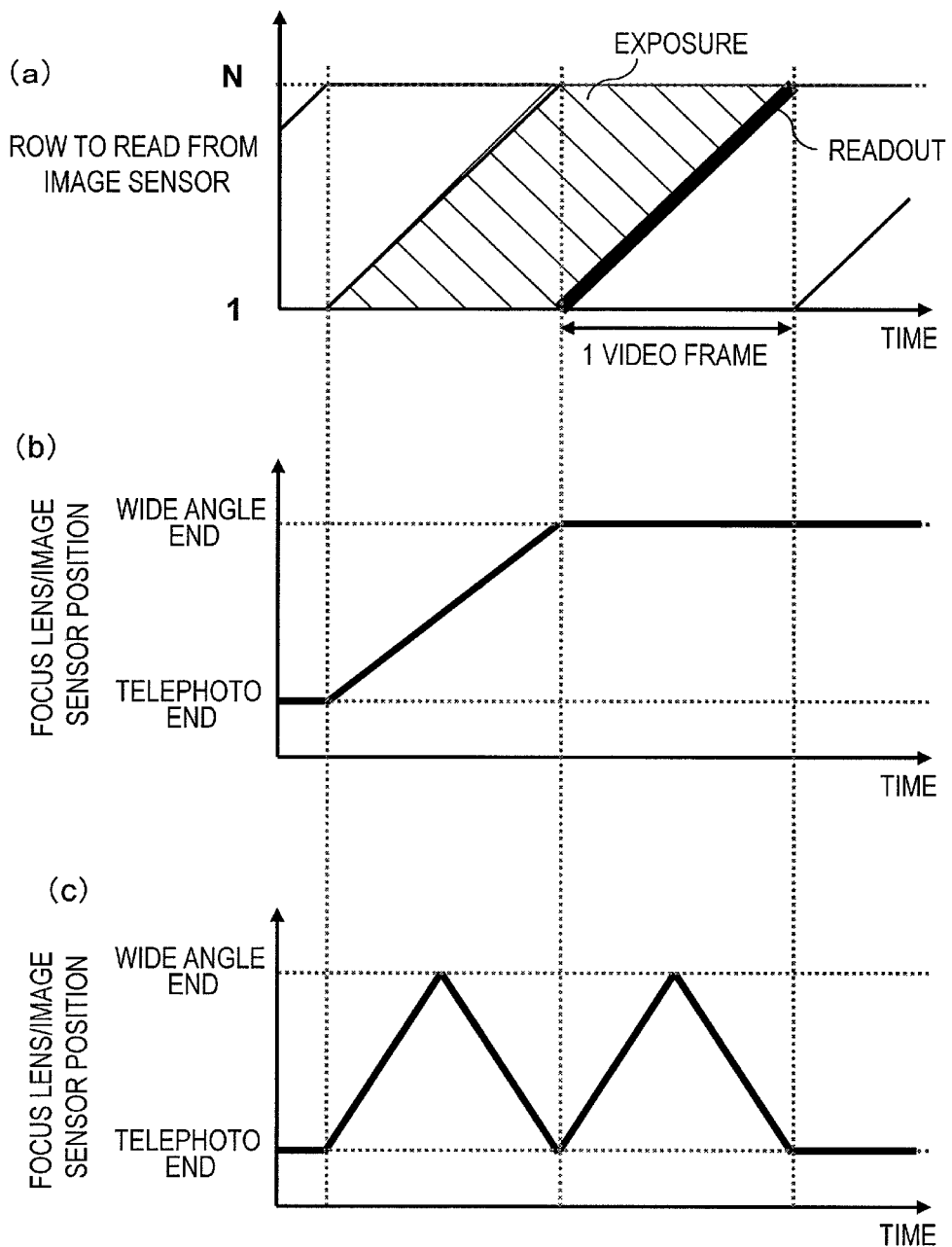
FIG. 7($a$) shows the rolling shutter operation of an image sensor implemented as a CMOS image sensor and 7($b$) and 7($c$) show exemplary displacement patterns of a focus lens.

Portion (a) of FIG. 7 indicates the timing for such an image sensor to extract electric charges from a set of pixels. In portion (a) of FIG. 7, the abscissa indicates the time and the ordinate indicates the location of a row to be scanned by the image sensor. The image sensor is made up of N rows of pixels. As shown in portion (a) of FIG. 7, the rows of the image sensor are sequentially scanned from the top row to begin with, thereby extracting electric charges from the respective pixels, and the electric charges start to be stored immediately after that. And when a predetermined amount of time passes, the rows of pixels are scanned again and electric charges are extracted from the respective pixels, thereby obtaining an image signal. When the $N^{th}$ row has been scanned, the scanning will be started all over again from the first row. In this manner, a continuous moving picture can be obtained. As can be seen from portion (a) of FIG. 7, if a shooting session is carried out by the rolling shutter method, then a shift in image capturing timing will be produced within the plane of the image sensor. As a result, a shift of one video frame at maximum could be produced between the first and last rows.

To get an image by the F-DOF method, every pixel within the plane of the image sensor needs to be exposed to light uniformly with the focusing state changed from the telephoto end through the wide angle end of a predetermined in-focus range. The abscissa of portion (b) of FIG. 7 corresponds to that of portion (a) of FIG. 7. Portion (b) of FIG. 7 shows the displacement pattern in a situation where the focus lens is subjected to a sweep operation from the telephoto end through the wide angle end within one video frame period by the rolling shutter method. If the image sensor is exposed to light at the timing shown in portion (a) of FIG. 7, the focus lens will move through the entire range, i.e., from the telephoto end through the wide angle end, while the first row to scan is being exposed to light. However, in a period in which the $N^{th}$ row is exposed to light, the focus lens is located only at the wide angle end. And while the rows intervening between them are exposed to light, the focus lens is displaced in only a part of the range from the telephoto end through the wide angle end. That is why even if the focus lens is displaced in the displacement pattern shown in portion (b) of FIG. 7, a correct sweep image cannot be obtained.

Portion (c) of FIG. 7 shows an exemplary displacement pattern which is suitably used for an image sensor implemented as a CMOS image sensor. In one video frame period, the displacement pattern shown in portion (c) of FIG. 7 starts to be displaced at the telephoto end, reaches the wide angle end, and then goes back to the telephoto end again. That is to say, this displacement pattern makes a roundtrip displacement from the telephoto end through the wide angle end every video frame period. Although one exposure period agrees with one video frame in this example, the roundtrip operation of the displacement pattern agrees with one video frame. However, the roundtrip operation just needs to be synchronized with one exposure period. That is to say, the roundtrip operation which is at least twice as long as, and may be an integral number of times as long as, one exposure period may be performed. In the displacement pattern shown in portion (c) of FIG. 7, the displacement pattern lasts for two video frame periods (i.e., the sweep operation is performed by making two round trips), and therefore, every pixel within the plane of the image sensor can be exposed to light uniformly.

If the image sensor 104 is implemented as a CMOS image sensor, a shooting session is carried out by the rolling shutter method, and therefore, some of the photoelectric conversion elements of the image sensor 104 form pixels other than effective pixels. Those photoelectric conversion elements do not contribute to forming an image but do require some time for reading. In other words, the amount of time it takes to expose the photoelectric conversion elements contributing to forming an image to light becomes shorter than the amount of time it takes to scan every pixel. That is why if the image sensor 104 is a CMOS image sensor, the focus lens may be displaced under a different condition from the condition for displacing the focus lens to get a half-sweep image while those photoelectric conversion elements not contributing to forming an image are being exposed to light and scanned. That is to say, when the focus lens is displaced in the first and second ranges and while those photoelectric conversion elements not contributing to forming an image are being exposed to light and scanned, the focus lens may be displaced under such a condition for displacing it in the third range, for example.

FIG. 8 shows a focus lens displacement pattern in a situation where half-sweep images are obtained by displacing the focus lens within two separate ranges using an image sensor implemented as a CMOS image sensor and also shows exemplary timings of exposure and reading for the image sensor. As shown in FIG. 8, to get a single sweep image, the focus lens 101 is displaced so as to make two round trips within each of the first and second ranges S1 and S2.

According to the displacement pattern shown in FIG. 8, the focus lens starts to be displaced in the middle of the third range S3 and rows of photoelectric conversion elements not to form an image start to be exposed to light. At this point in time, the displacement velocity of the focus lens is the velocity in the third range S3. Subsequently, after the focus lens has started to be displaced in the first range and when rows of photoelectric conversion elements to form an image start to be exposed to light, the focus lens starts to be displaced under a condition for obtaining a half-sweep image. That is to say, the displacement velocity of the focus lens is slowed down. Also, since those rows of photoelectric conversion elements to form an image finish being exposed to light right after the focus lens has been displaced in the first range, the focus lens is displaced from then on at the velocity for use in displacing it in the third range S3. The control operation is performed in the same way even when the focus lens is displaced in the second range. As can be seen from FIG. 8, as for any of the rows of photoelectric conversion elements that form an image, the focus lens makes one round trip in the first range S1 and the exposure time is constant. Also, the position P1 of the focus lens when the displacement velocity of the focus lens in the third range S3 is switched into a displacement velocity for getting a half-sweep image agrees with the position P2 of the focus lens when the displacement velocity for getting a half-sweep image is switched into the displacement velocity of the focus lens in the third range S3.

According to the displacement pattern shown in FIG. 8, rows of photoelectric conversion elements to form an image are exposed to light in the first and second ranges but are not exposed to light in the third range. By adopting such a displacement pattern, while rows of photoelectric conversion elements not to form an image are exposed to light and scanned, the displacement velocity of the focus lens can be increased and eventually the frame rate of the image capture device can be increased. In addition, by adopting such a displacement pattern, a half-sweep image can be obtained without using an electronic shutter.

FIG. 9 shows another focus lens displacement pattern in a situation where an image sensor is implemented as a CMOS image sensor and also shows exemplary timings of exposure and reading for the image sensor. According to the focus lens displacement pattern shown in FIG. 9, the position P1 of the focus lens when the displacement velocity of the focus lens in the third range S3 is switched into a displacement velocity for getting a half-sweep image disagrees with the position P2 of the focus lens when the displacement velocity for getting a half-sweep image is switched into the displacement velocity of the focus lens in the third range S3. Even so, however, as for any of the rows of photoelectric conversion elements that form an image, the focus lens also makes one round trip in the first range S1 and the exposure time is constant. Consequently, even when such a displacement pattern is adopted, a half-sweep image can also be obtained without using an electronic shutter.

FIGS. 10 and 11 show other focus lens displacement patterns in a situation where an image sensor is implemented as a CMOS image sensor and also show exemplary timings of exposure and reading for the image sensor. According to the displacement patterns shown in FIGS. 10 and 11, the amount of time for which photoelectric conversion elements to form an image are exposed to light is shortened by an electronic shutter compared to the displacement patterns shown in FIG. 8 and 9. In such a situation where the amount of time for which photoelectric conversion elements to form an image are exposed to light is shortened, unless the operating time of the rolling shutter of the image sensor 104 changes, the non-exposure period produced by the electronic shutter becomes relatively long. That is why the displacement velocity of the focus lens 101 in the third range is slowed down.

As can be seen, even when such an image sensor which performs a rolling shutter operation and which is implemented as a CMOS image sensor is used, half-sweep images are also obtained by driving the focus lens in two separate ranges and information about the subject distance is also calculated based on the half-sweep images thus obtained. As a result, the subject distance can also be estimated highly accurately.

It should be noted that if the focus lens is driven using any of the displacement patterns shown in FIGS. 10 and 11, the non-exposure period by the electronic shutter can be set arbitrarily. That is why according to the displacement patterns shown in FIGS. 10 and 11, the position of the focus lens when the exposure process is started by the electronic shutter can also be determined arbitrarily. In addition, the non-exposure period can be set by the electronic shutter while the focus lens is being displaced in the first and second ranges S1 and S2. And the displacement velocity of the focus lens during this non-exposure period can be set to be any arbitrary value.

(Embodiment 4)

In the image capture devices of the first to third embodiments described above, while either the focus lens 101 or the image sensor 104 is being displaced in the third range, the image sensor is not exposed to light. However, as already described for the first embodiment, as long as half-sweep images are obtained in the first and second ranges that are separate from each other, the subject distance can also be estimated highly accurately. That is why an image may also be obtained by exposing the image sensor to light in part or all of the period in which either the focus lens 101 or the image sensor 104 is displaced in the third range. Also, as long as the third range is included, the focus lens 101 or the image sensor 104 may be displaced in part or all of the first or second range, too. As a result, not only half-sweep images but also a full-sweep image or an image at a fixed focus position can be obtained as well. Thus, such an image capture device will be described below as a fourth embodiment of the present invention.

The image capture device of this embodiment has the same structure as the image capture device 100 of the first embodiment or the image capture device 200 of the second embodiment. Differences from the first or second embodiment lie in the timing of exposure and the displacement pattern of the image sensor or the focus lens during the sweep operation, and therefore, the following description will be focused on these differences.

Figure 12:
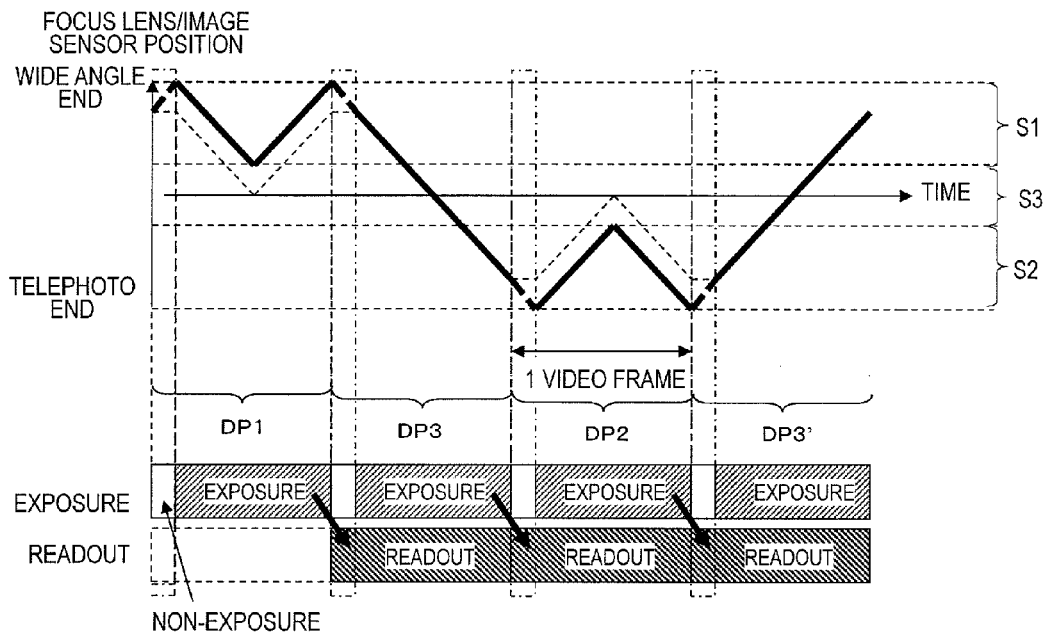
FIG. 12 shows an exemplary focus lens displacement pattern and exemplary timing of exposure according to a fourth embodiment.

FIG. 12 shows an example in which the third type of displacement pattern represents a single displacement over the entire range, i.e., the entire first, second and third ranges. In FIG. 12, DP1, DP2 and DP3 indicate the first, second and third types of displacement patterns, respectively.

As shown in FIG. 12, first of all, the focus lens driving section 103 moves the focus lens 101 to its initial position in accordance with an instruction given by the focus lens displacement control section 106. In this embodiment, the focus lens 101 is moved toward a part of the first range S1 that is a little closer to the telephoto end than the wide angle end is.

First, according to the first type of displacement pattern DP1, the focus lens 101 is displaced from the initial position to the wide angle end of the first range S1. In the meantime, the photoelectric conversion elements of the image sensor 104 are not exposed to light. In this manner, the focus lens 101 is moved to the wide angle end of the first range S1 without forming an image.

Subsequently, the focus lens 101 is displaced through the entire first range S1. In this embodiment, the image sensor 104 is a CCD image sensor and is exposed to light through a global shutter. That is why if the focus lens 101 moves through the entire first range S1 at least once, a uniform half-sweep image can be obtained. However, in this embodiment, since a full-sweep image needs to be obtained next, the focus lens 101 is displaced so as to move toward the telephoto end and then go back to the wide angle end again (i.e., to make a round trip in the first range S1). In the meantime, the photoelectric conversion elements are exposed to light. In this manner, a half-sweep image can be obtained.

Next, according to the third type of displacement pattern DP3, the focus lens 101 is displaced from the wide angle end to a little before the telephoto end through the entire first range S1, the entire third range S3 and almost the entire second range S2. Until the focus lens 101 reaches a little closer to the telephoto end from the wide angle end, the photoelectric conversion elements of the image sensor 104 are not exposed to light. After that, the focus lens 101 is displaced to a little before the telephoto end with the photoelectric conversion elements exposed to light. As a result, a full-sweep image can be obtained from almost the entire first range, the entire third range and almost the entire second range.

Next, according to the second type of displacement pattern DP2, the focus lens 101 is displaced in the second range S2. Specifically, the focus lens 101 is moved from a little before the telephoto end to the telephoto end with the photoelectric conversion elements still not exposed to light. Subsequently, with the photoelectric conversion elements exposed to light, the focus lens 101 is moved to make a round trip through the entire second range S2. As a result, a half-sweep image can be obtained.

Finally, according to the modified third type of displacement pattern DP3', the focus lens 101 is displaced from the telephoto end to a little before the wide angle end through the entire second range S2, the entire third range S3 and almost the entire first range S1. Until the focus lens 101 reaches a little closer to the wide angle end from the telephoto end, the photoelectric conversion elements of the image sensor 104 are not exposed to light. After that, the focus lens 101 is displaced to a little before the wide angle end with the photoelectric conversion elements exposed to light. As a result, a full-sweep image can be obtained from almost the entire second range, the entire third range and almost the entire first range.

According to this embodiment, half-sweep images and a full-sweep image can be obtained by being shot in two separate ranges. That is why as already described for the first embodiment, the subject distance can be estimated highly accurately by using the half-sweep images. In addition, by processing the full-sweep image using the subject distance estimated, an image which has been re-focused on a subject located at an arbitrary distance in the image can be obtained.

Moreover, according to this embodiment, the full-sweep displacement pattern is interposed between the two half-sweep displacement patterns. That is why before and after each all-in-focus image is obtained by shooting, shooting sessions are carried out to obtain half-sweep images. As a result, an all-in-focus image, a near sweep image and a far sweep image can be obtained continuously. Thus, the all-in-focus image and information about the estimated subject distance can be obtained every two video frames. Consequently, a smooth EDOF moving picture can be obtained. For example, if an image sensor that can shoot an image at 30 fps is used, a 15 fps three-dimensional moving picture can be obtained. And if an image sensor which can shoot an image at an even higher rate is used, a smoother (high frame rate) EDOF moving picture is realized.

On top of that, according to this embodiment, an all-in-focus image is obtained by using a full-sweep displacement pattern which is as long as one video frame period. That is why the entire all-in-focus image can be obtained at the same timing altogether. As a result, a natural all-in-focus image can be obtained. In view of these considerations, according to this embodiment, a high-quality, natural and smooth EDOF moving picture can be obtained.

According to the sweep pattern shown in FIG. 12, the third type of displacement pattern represents a displacement in almost the entire first, second and third ranges. However, as long as displacement covers the entire third range, any other displacement pattern may also be used.

Figure 13:
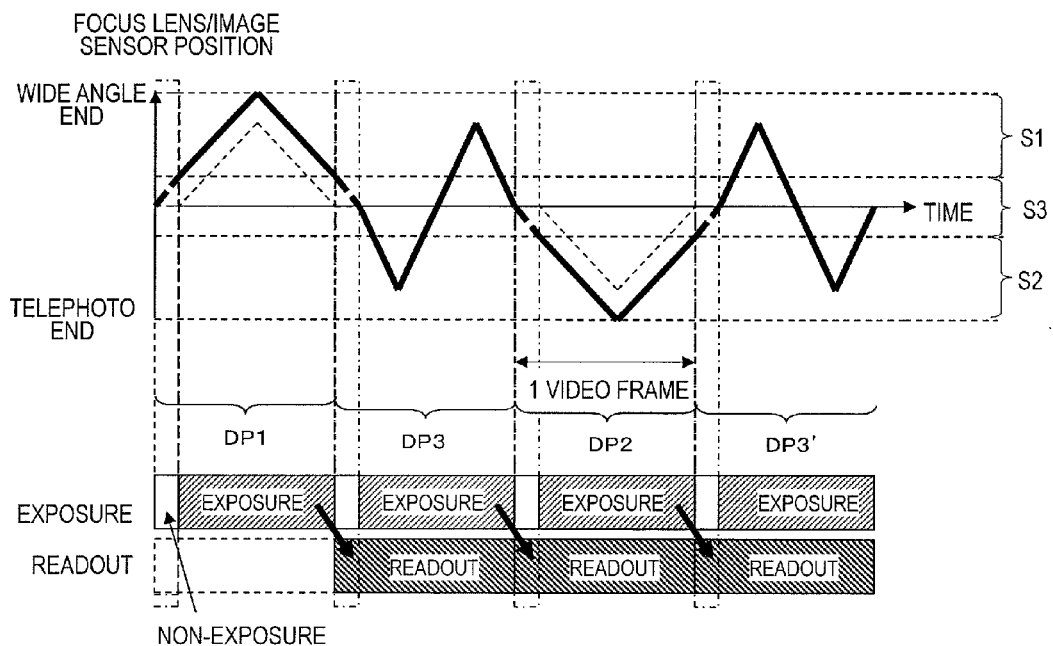
FIG. 13 shows an exemplary focus lens displacement pattern and exemplary timing of exposure according to the fourth embodiment.

FIG. 13 shows a sweep pattern in which the third type of displacement pattern DP3 and the modified third type of displacement pattern DP3' represent a displacement in a part of the range between the telephoto end and the wide angle end.

Figure 14:
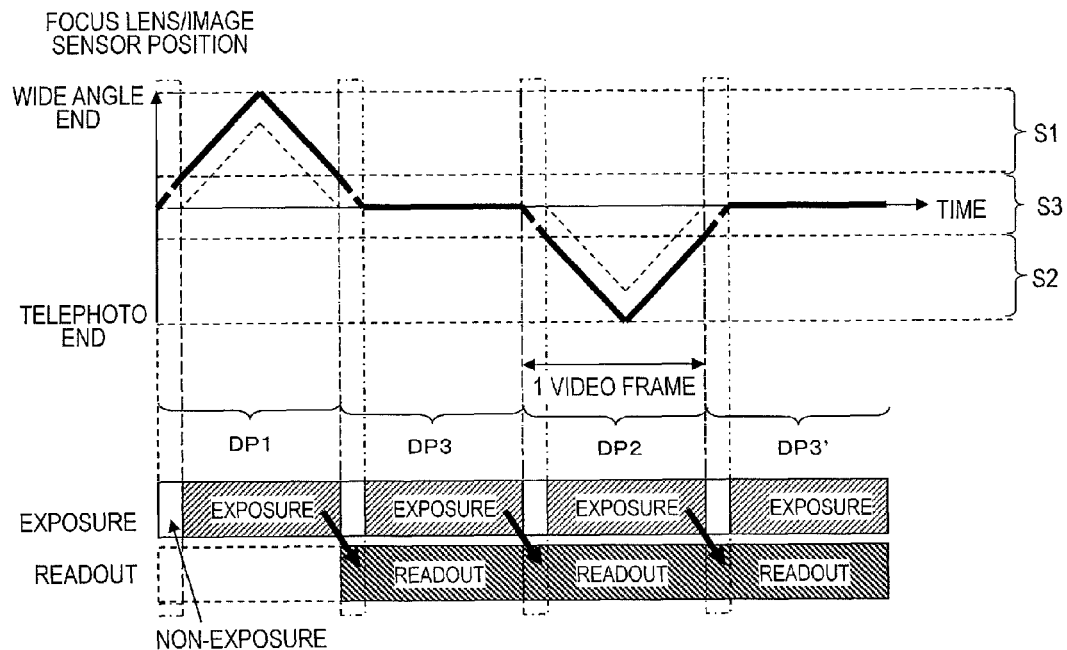
FIG. 14 shows an exemplary focus lens displacement pattern and exemplary timing of exposure according to the fourth embodiment.

Also, as shown in FIG. 14, the third type of displacement pattern may include a displacement pattern according to which the focus lens is not displaced but stays at a predetermined position. In that case, not only the two half-sweep images but also an image which has been shot under normal shooting condition so as to be in focus on a subject at a predetermined distance can be obtained as well.

Figure 15:
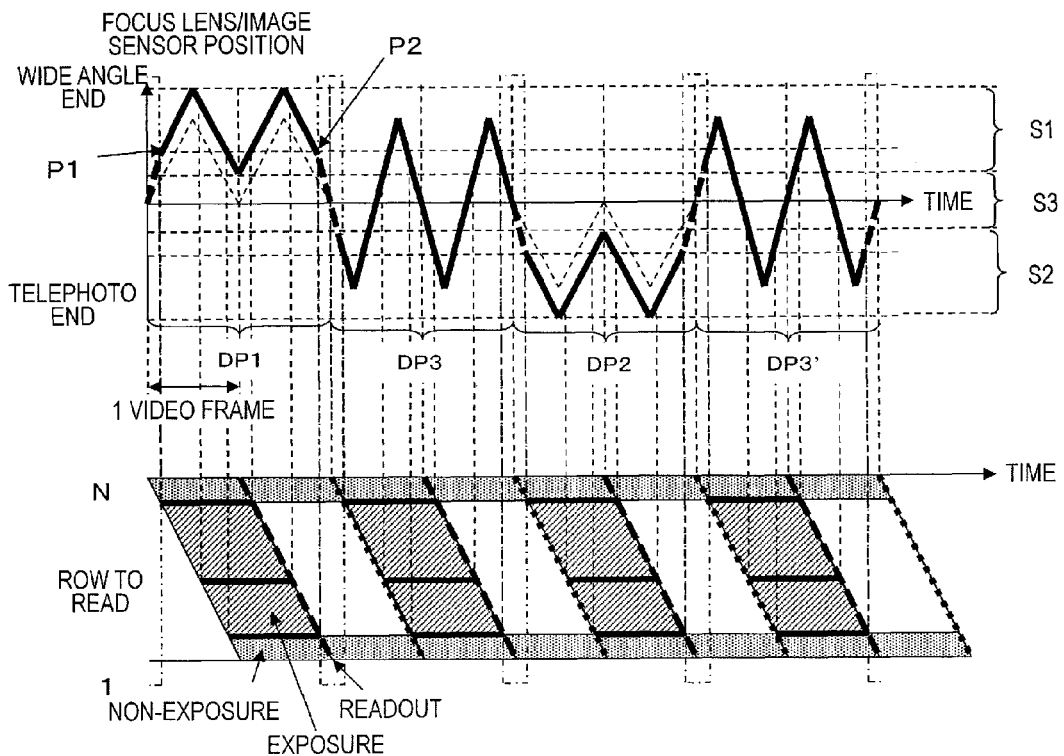
FIG. 15 shows an exemplary focus lens displacement pattern and exemplary timing of exposure according to the fourth embodiment.
Figure 16:
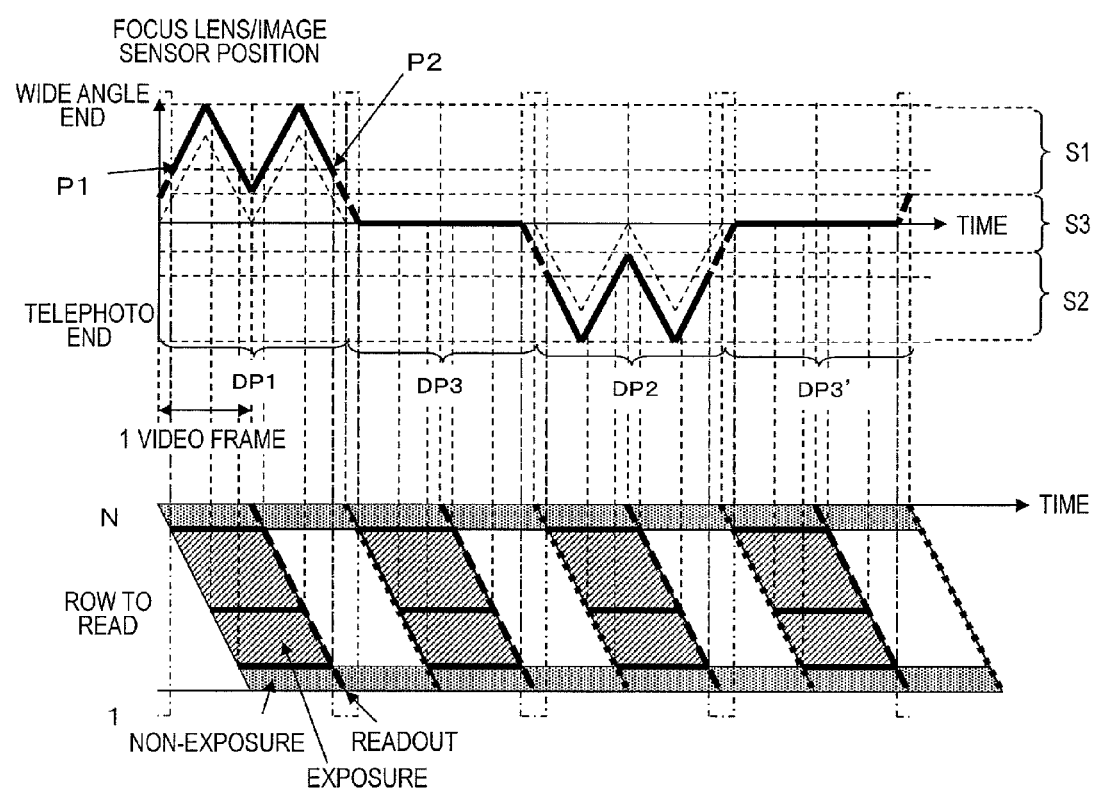
FIG. 16 shows an exemplary focus lens displacement pattern and exemplary timing of exposure according to the fourth embodiment.

Optionally, the image sensor may also be a CMOS image sensor to be exposed to light using a rolling shutter as already described for the third embodiment. FIGS. 15 and 16 show displacement patterns to be adopted in a situation where the sweep operation shown in FIGS. 13 and 14 is performed using an image sensor which is implemented as a CMOS image sensor. As already described for the third embodiment, by having the focus lens make two round trips in each of the first and second ranges and a range in which displacement is carried out in the third type (and modified third type) of displacement pattern DP3 (DP3'), every pixel in the image sensor can be exposed to light uniformly. As long as the focus lens makes at least two round trips, the focus lens may make roundtrip displacements three or any other larger integral number of times. In that case, the image sensor is exposed to light at the timing that has already been described for the third embodiment.

As can be seen, according to this embodiment, half-sweep images can be obtained in the first and second ranges that are separate from each other, and the subject distance can be estimated highly accurately. In addition, an image can be obtained by exposing the image sensor to light in the third range in a part or all of the period in which either the focus lens 101 or the image sensor 104 is displaced. As long as the third range is covered, the displacement at this time may be carried out in part or all of the first and second ranges. Also, the image sensor may be exposed to light in part or all of the range in the third type of displacement pattern. Consequently, not only the half-sweep images described above but also images that have been shot under various conditions can be obtained as well.

(Embodiment 5)

An image capture device as a fifth embodiment of the present invention obtains an EDOF moving picture by changing the displacement range of the focus lens as the subject moves. For that purpose, the image capture device of this embodiment displaces the focus lens in the displacement pattern to be described below. The image capture device of this embodiment may have the same configuration as the image capture device of the first or second embodiment described above. The image sensor may be a CCD image sensor or a CMOS image sensor. In the following description of the fifth embodiment, the image capture device is supposed to have the same configuration as the image capture device of the first embodiment and the image sensor is supposed to be a CMOS image sensor, as just an example.

FIG. 17(a) shows a focus lens displacement pattern according to this embodiment to be adopted in a situation where the subject of interest is coming toward the image capture device.

The displacement pattern shown in FIG. 17(a) is a series of displacement patterns S10, S20, S30, S40 and S50 for obtaining two half-sweep images. Each of these displacement patterns S10, S20, S30, S40 and S50 may correspond to the displacement pattern that has been described for the third embodiment with reference to FIG. 8. Specifically, the focus lens is displaced in the first, second and third ranges S11, S12 and S13 as already described for the third embodiment. As can be seen from FIG. 17(a), the focus lens displacement range of the displacement pattern S20 has shifted overall toward the wide angle end compared to the displacement pattern S10. In the same way, the focus lens displacement range of the displacement pattern S30 has shifted overall toward the wide angle end compared to the displacement pattern S20. And the same can be said about the displacement patterns S40 and S50, too. The respective first ranges S11, S21, S31, S41 and S51 of these displacement patterns may be as long as their second ranges S12, S22, S32, S42 and S52, for example.

Figure 17:
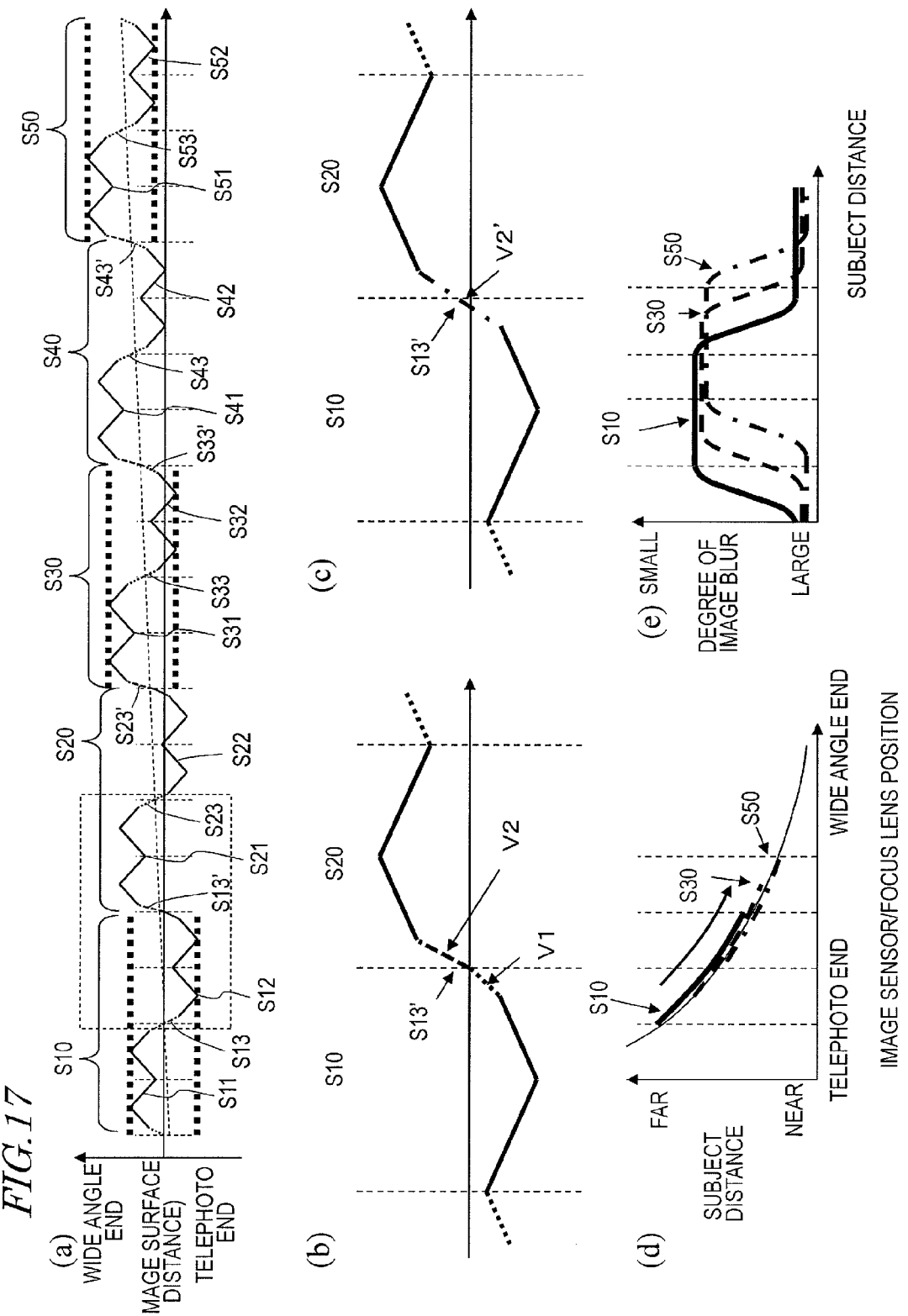
FIG. 17($a$) shows an exemplary focus lens displacement pattern according to a fifth embodiment, 17($b$) and 17($c$) show an exemplary displacement velocity in a third range S13', 17($d$) shows displacement ranges of displacement patterns S10, S30 and S50, and 17($e$) shows how the degree of image blur changes with the subject distance in images obtained by adopting the displacement patterns S10, S30 and S50.

In shifting the focus lens displacement range toward the wide angle end in this manner, a third range S13' for moving the focus lens from the second range S12 of the displacement pattern S10 to the first range of the displacement pattern S20 is set to extend longer toward the wide angle end than the third range S13 is as shown in FIG. 17. In that case, as shown in FIG. 17(b), in the third range S13' of the displacement pattern S10, the focus lens may be displaced at as high as velocity V1 as in the third range S13. And in the third range S13' of the displacement pattern S20, the focus lens may be displaced at a velocity V2 which is higher than the velocity V1. Alternatively, as shown in FIG. 17(c), the focus lens may be displaced at a velocity V2' which is higher than the velocity V1 in the entire third range S13'. As described above, these third ranges S13 and S13' have mutually different lengths. That is why by setting the velocities in this manner and by making the time it takes for the focus lens to pass through the third range S13 and the time it takes for the focus lens to pass through the third range S13' equal to each other, all frame periods can be made as long as each other.

FIG. 17(d) shows the focus lens displacement ranges according to the displacement patterns S10, S30 and S50. FIG. 17(e) shows how the degree of image blur changes with the subject distance in half-sweep images to be obtained by adopting the displacement patterns S10, S30 and S50. As can be seen from these drawings, by shifting the displacement patterns for obtaining half-sweep images, the in-focus range can be shifted with the degree of image blur kept constant.

As can be seen, according to this embodiment, by shifting the focus lens displacement range in the displacement patterns for obtaining half-sweep images, an EDOF moving picture can be obtained with the in-focus range changed. That is why even if the subject is moving to change the distance between the image capture device and the subject, half-sweep images can also be obtained by changing the in-focus range as the subject moves.

In the embodiment described above, a displacement pattern to be used in a situation where the subject is coming toward the image capture device has been described. However, this embodiment can also be used effectively even in a situation where the subject is going away from the image capture device. In that case, if the third range S13' is set to be shorter than the third range S13 at the wide angle end, the displacement pattern S20 can be shifted toward the telephoto end compared to the displacement pattern S10. Also, the subject does not have to be moved at a constant velocity. In that case, the lengths of the respective third ranges S13', S23', S33' and S43' may be increased or decreased according to the moving velocity of the subject. That is to say, as the subject moves, the positions of the displacement patterns S10, S20, S30, S40 and S50 may be shifted between the telephoto end and the wide angle end.

Furthermore, in this embodiment, the distance to the subject may or may not be calculated as described for the first and second embodiments.

Industrial Applicability

An image capture device, integrated circuit and image capturing method according to the present disclosure can be used effectively in various image capture devices such as digital still cameras and digital camcorders as either consumer electronic devices or professional shooting equipment.

Reference Signs List 100, 200, 300, 400 image capture device
101 focus lens
102 focus lens position detecting section
103 focus lens driving section
104 image sensor
105 focus lens displacement setting section
106 focus lens displacement control section
107 exposure-focus lens displacement synchronizing section
108 reading circuit
109 image processing section
110 writing section
111 shutter
112 shutter opening/closing instructing section
113 release accepting section
114 exposure time determining section
115 focus lens position detecting section
120 lens
202 image sensor position detecting section
203 image sensor driving section
205 image sensor displacement setting section
206 image sensor displacement control section
207 exposure-image sensor displacement synchronizing section

The invention claimed is:

1. An image capture device comprising:
an image sensor which includes a plurality of photoelectric conversion elements that are arranged two-dimensionally to form an image capturing plane and which gets the plurality of photoelectric conversion elements exposed to light and reads an electrical signal from the plurality of photoelectric conversion elements, thereby generating an image signal;
a lens optical system which collects light onto the image sensor and which includes a focus lens;
a driving section configured to drive one of the image sensor and the focus lens so as to change a distance between the image sensor and the focus lens;
a displacement control section configured to control the displacement of one of the image sensor and the focus lens being driven according to a predetermined displacement pattern by outputting an instruction to the driving section; and
a synchronizing section configured to control the displacement control section by reference to timing of exposure of the image sensor,
wherein the displacement range of one of the image sensor and the focus lens includes a first range, a second range which is separated from the first range, and a third range interposed between the first and second ranges, between a first in-focus position of the focus lens or the image sensor at which a focus is set at a first subject distance in a scene to be shot and a second in-focus position of the focus lens or the image sensor at which a focus is set at a second subject distance in the scene to be shot,
the predetermined displacement pattern includes first, second and third types of displacement patterns according to which one of the image sensor and the focus lens is displaced at least once in each of the entire first, second and third ranges,
one of the first and second types of displacement patterns and the third type of displacement pattern are repeated alternately,
while some of the plurality of photoelectric conversion elements which form an image are being exposed to light, one of the image sensor and the focus lens is displaced according to the first and second types of displacement patterns, and
while those photoelectric conversion elements that form an image are not being exposed to light, one of the image sensor and the focus lens is displaced according to the third type of displacement pattern.

2. The image capture device of claim 1, wherein each of the first and second types of displacement patterns includes a sub-displacement pattern to displace one of the image sensor and the focus lens at substantially a constant velocity, and the velocity according to the sub-displacement pattern of the first type of displacement pattern is as high as the velocity according to the sub-displacement pattern of the second type of displacement pattern.

3. The image capture device of claim 2, wherein the velocity at which one of the image sensor and the focus lens is displaced according to the third type of displacement pattern is different from the velocity according to any of the sub-displacement patterns of the first and second types of displacement patterns.

4. The image capture device of claim 2, wherein the velocity at which one of the image sensor and the focus lens is displaced according to the third type of displacement pattern is higher than the velocity according to any of the sub-displacement patterns of the first and second types of displacement patterns.

5. The image capture device of claim 1, wherein according to the third type of displacement pattern, at least one displacement is carried out in the entire range including the entire third range and at least respective parts of the first and second ranges.

6. The image capture device of claim 5, wherein according to the third type of displacement pattern, at least one displacement is carried out in the entire range including the entire third range and all of the first and second ranges.

7. The image capture device of claim 1, wherein according to the third type of displacement pattern, a no-displacement period is included in the third range.

8. The image capture device of claim 5, wherein some of the photoelectric conversion elements that are going to form an image are exposed to light in at least respective parts of periods in which one of the image sensor and the focus lens is displaced according to the first type of displacement pattern, the second type of displacement pattern and the third type of displacement pattern.

9. The image capture device of claim 1, wherein according to the first and second types of displacement patterns, one of the image sensor and the focus lens makes at least one round trip through each of the entire first and second ranges.

10. The image capture device of claim 1, wherein as the first, second and third types of displacement patterns are repeated, the first, second and third ranges change their locations.

11. The image capture device of claim 10, wherein as the first, second and third types of displacement patterns are repeated, the first and second ranges keep having the same length but change their locations between the first and second in-focus positions.

12. The image capture device of claim 1, further comprising:
an exposure time determining section configured to determine the exposure time of the image sensor according to a scene to be shot; and
a displacement setting section configured to determine the displacement pattern based on the first and second in-focus positions and the exposure time.

13. The image capture device of claim 12, further comprising a position detecting section configured to detect the position of one of the image sensor and the focus lens,
wherein the displacement control section instructs the driving section how much to drive based on the output of the position detecting section and the displacement pattern.

14. The image capture device of claim 13, further comprising a reading circuit configured to read the image signal from the image sensor,
wherein the synchronizing section controls the displacement control section and the reading circuit by reference to the timing of exposure of the image sensor.

15. The image capture device of claim 1, wherein the image sensor is a CCD image sensor.

16. The image capture device of claim 1, wherein the image sensor is a CMOS image sensor.

17. The image capture device of claim 16, wherein according to each of the first and second types of displacement patterns, roundtrip displacements are carried out at least twice, or any other larger integral number of times, all through the entire displacement range.

18. An integrated circuit for use in an image capture device, the image capture device including: an image sensor which includes a plurality of photoelectric conversion elements that are arranged two-dimensionally to form an image capturing plane and which gets the plurality of photoelectric conversion elements exposed to light and reads an electrical signal from the plurality of photoelectric conversion elements, thereby generating an image signal; a lens optical system which collects light onto the image sensor and which includes a focus lens; and a driving section configured to drive one of the image sensor and the focus lens so as to change a distance between the image sensor and the focus lens,
the integrated circuit comprising:
a displacement control section configured to control the displacement of one of the image sensor and the focus lens being driven according to a predetermined displacement pattern by outputting an instruction to the driving section; and
a synchronizing section configured to control the displacement control section by reference to timing of exposure of the image sensor,
wherein the displacement range of the image sensor or the focus lens includes a first range, a second range which is separated from the first range, and a third range interposed between the first and second ranges, between a first in-focus position of the focus lens or the image sensor at which a focus is set at a first subject distance in a scene to be shot and a second in-focus position of the focus lens or the image sensor at which a focus is set at a second subject distance in the scene to be shot,
the predetermined displacement pattern includes first, second and third types of displacement patterns according to which one of the image sensor and the focus lens is displaced at least once in each of the entire first, second and third ranges, and
one of the first and second types of displacement patterns and the third type of displacement pattern are repeated alternately,
while some of the plurality of photoelectric conversion elements which form an image are being exposed to light, one of the image sensor and the focus lens is made to be displaced according to the first and second types of displacement patterns, and
while those photoelectric conversion elements that form an image are not being exposed to light, one of the image sensor and the focus lens is made to be displaced according to the third type of displacement pattern.

19. An image capturing method in which light is collected through a focus lens onto an image sensor, which includes a plurality of photoelectric conversion elements that are arranged two-dimensionally to form an image capturing plane and which gets the plurality of photoelectric conversion elements exposed to light and reads an electrical signal from the plurality of photoelectric conversion elements to generate an image signal, thereby getting the plurality of photoelectric conversion elements exposed to light while displacing either the focus lens or the image sensor according to a predetermined displacement pattern and imaging a scene to be shot,
wherein the displacement range of the image sensor or the focus lens includes a first range, a second range which is separated from the first range, and a third range interposed between the first and second ranges, between a first in-focus position of the focus lens or the image sensor at which a focus is set at a first subject distance in a scene to be shot and a second in-focus position of the focus lens or the image sensor at which a focus is set at a second subject distance in the scene to be shot,
the predetermined displacement pattern includes first, second and third types of displacement patterns according to which one of the image sensor and the focus lens is displaced at least once in each of the entire first, second and third ranges, and
one of the first and second types of displacement patterns and the third type of displacement pattern are repeated alternately,
while some of the plurality of photoelectric conversion elements which form an image are being exposed to light, one of the image sensor and the focus lens is made to be displaced according to the first and second types of displacement patterns, and while those photoelectric conversion elements that form an image are not being exposed to light, one of the image sensor and the focus lens is made to be displaced according to the third type of displacement pattern.

* * * * *